United States Patent [19]

Bishop et al.

[11] 4,056,843

[45] Nov. 1, 1977

[54] DATA PROCESSING SYSTEM HAVING A PLURALITY OF CHANNEL PROCESSORS

[75] Inventors: Richard L. Bishop; Steven P. Tulloh, both of Sunnyvale, Calif.

[73] Assignee: Amdahl Corporation, Sunnyvale, Calif.

[21] Appl. No.: 693,553

[22] Filed: June 7, 1976

[51] Int. Cl.² ............... G06F 15/20; G06F 13/00; G06F 3/00

[52] U.S. Cl. .................................. 364/200

[58] Field of Search .................. 340/172.5; 364/200

[56] References Cited

U.S. PATENT DOCUMENTS

| | | | |
|---|---|---|---|
| 3,432,813 | 3/1969 | Annunziata | 340/172.5 |
| 3,526,878 | 9/1970 | Bennett | 340/172.5 |
| 3,673,576 | 6/1972 | Donaldson, Jr. | 340/172.5 |
| 3,675,209 | 7/1972 | Trost | 340/172.5 |
| 3,934,232 | 1/1976 | Curley | 340/172.5 |

*Primary Examiner*—James D. Thomas
*Attorney, Agent, or Firm*—Flehr, Hohbach, Test, Albritton & Herbert and David E. Lovejoy

[57] ABSTRACT

Disclosed is a data processing system including a channel unit which services a plurality of channels. The channel unit is connected between the data processing system and the control units which control the operations of I/O devices. The channel unit includes one processor for controlling transfers between channel storage and system storage and having another processor for controlling transfers between input/output devices and channel storage.

14 Claims, 9 Drawing Figures

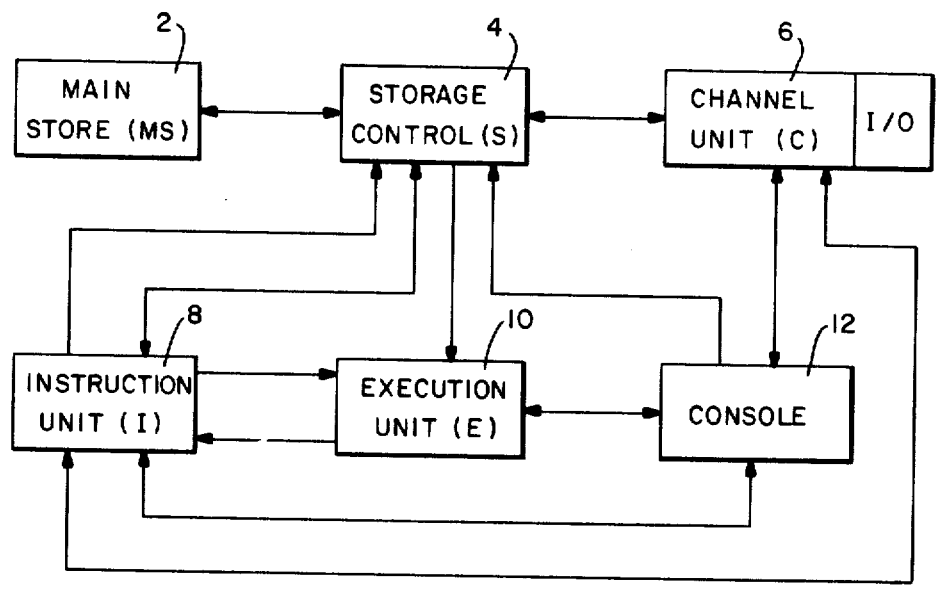
FIG.—1
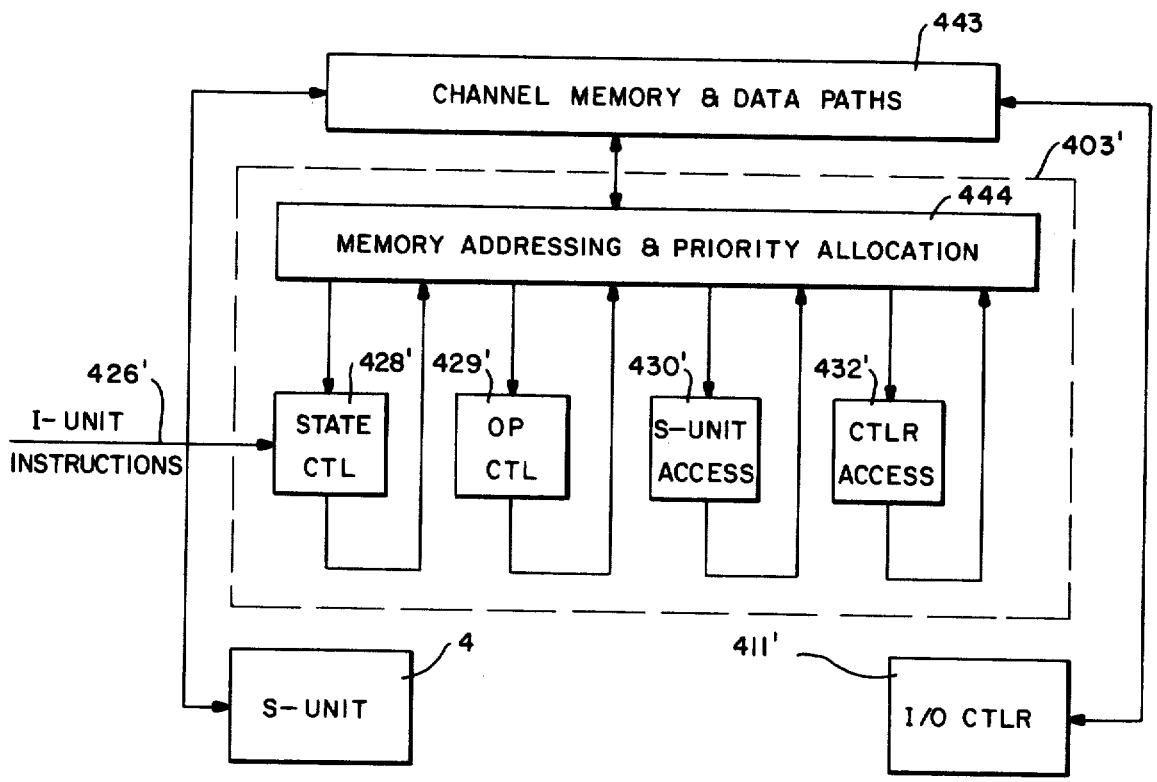
FIG.—2

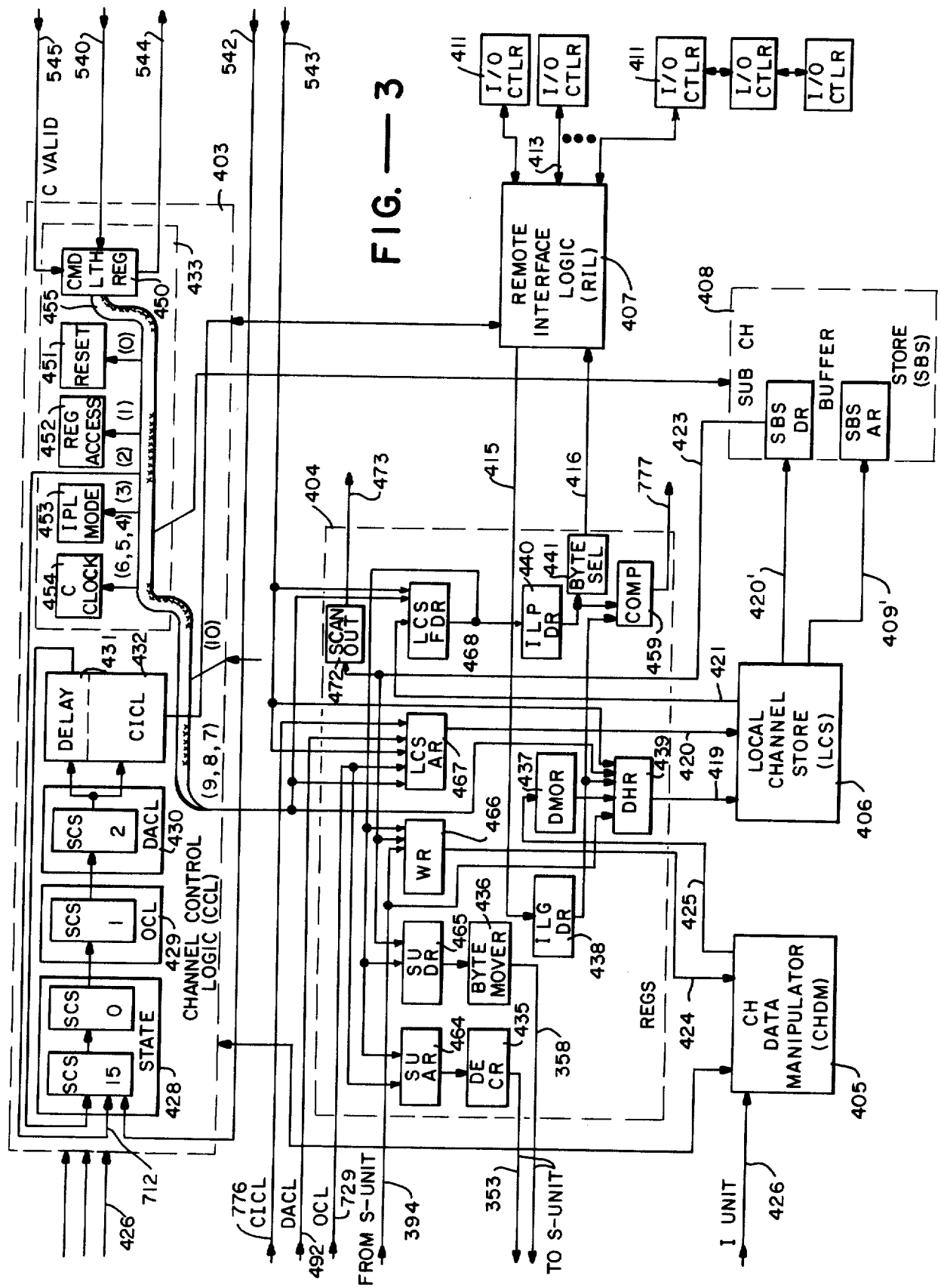

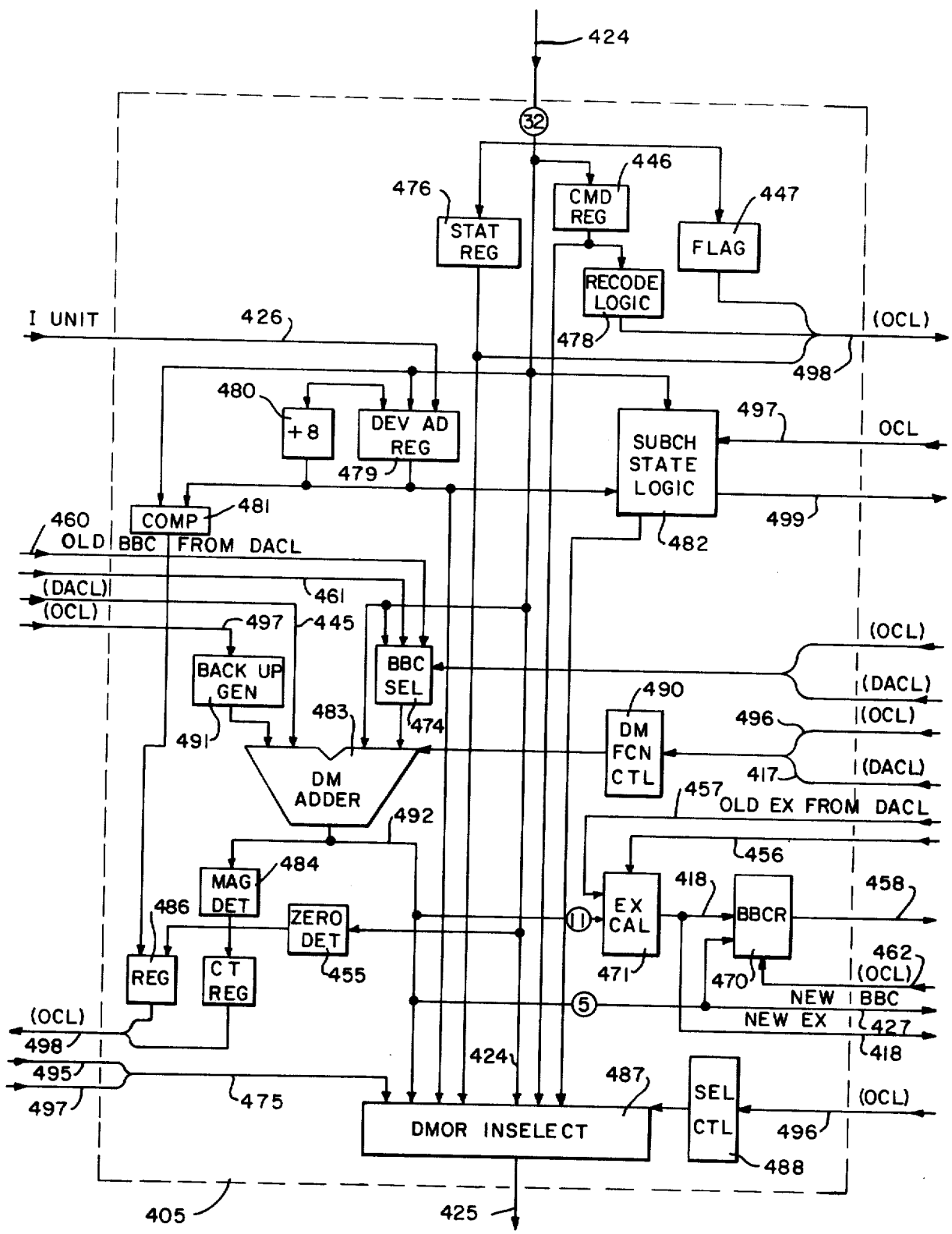
FIG.—4

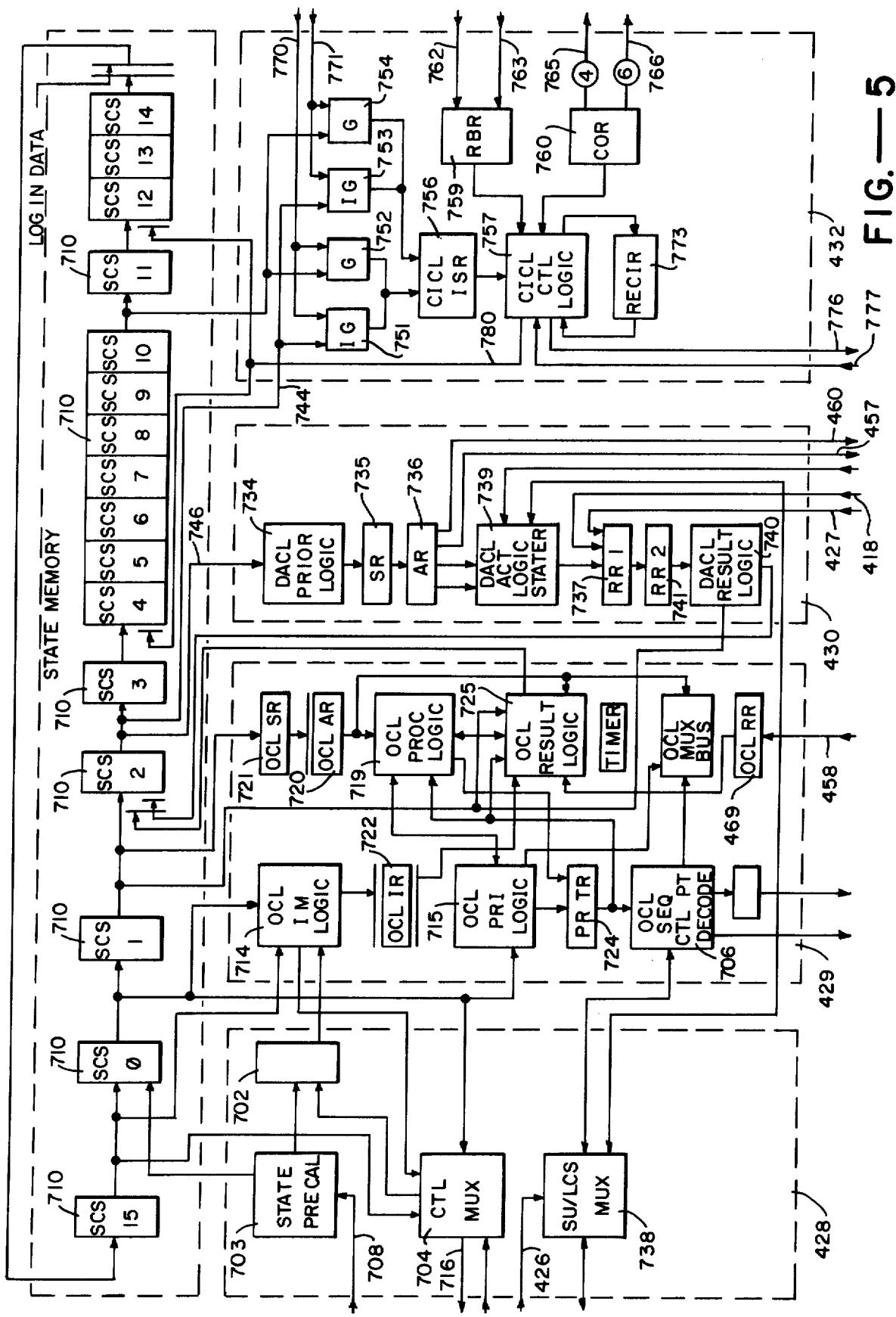
FIG.—5

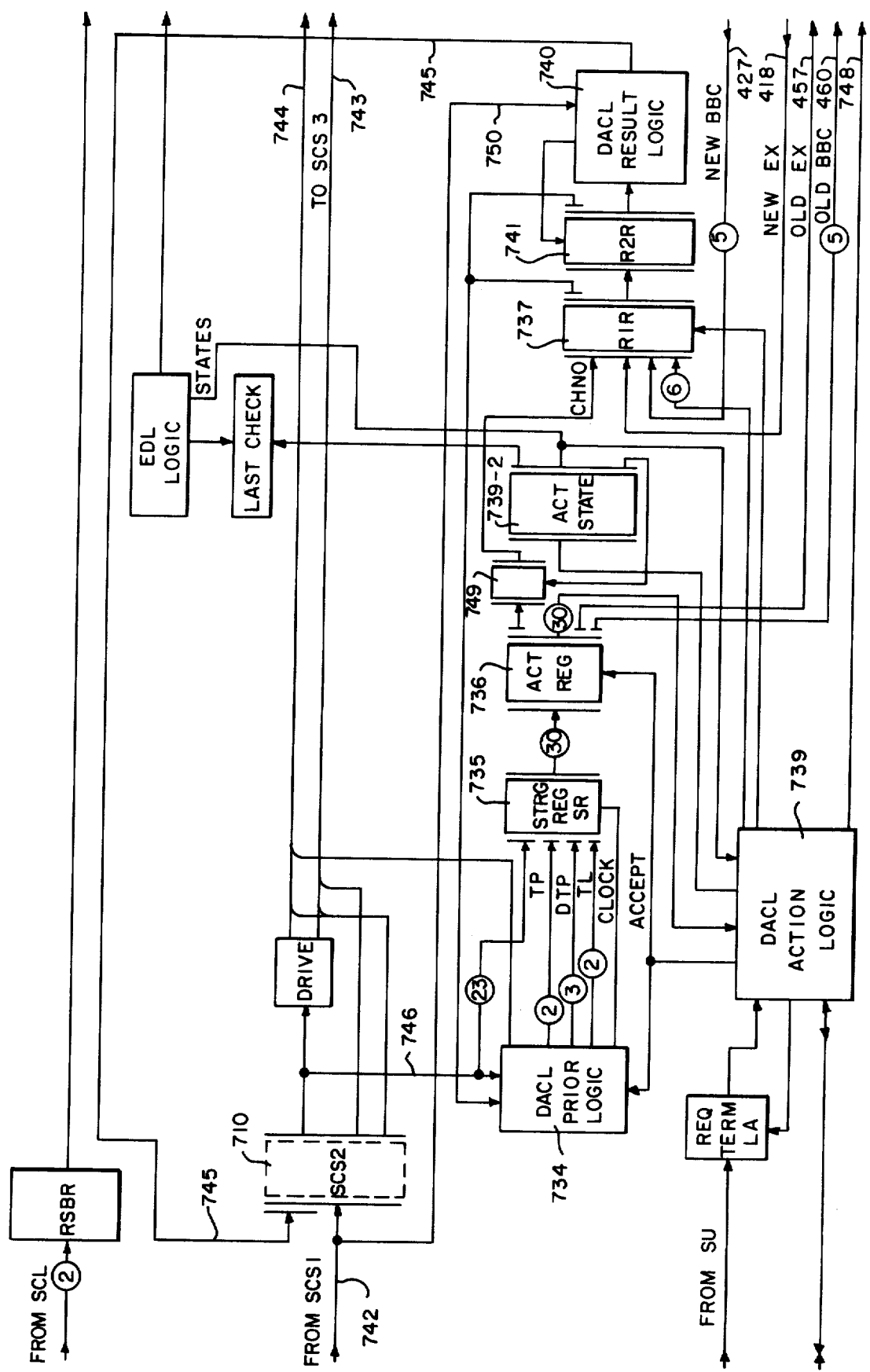

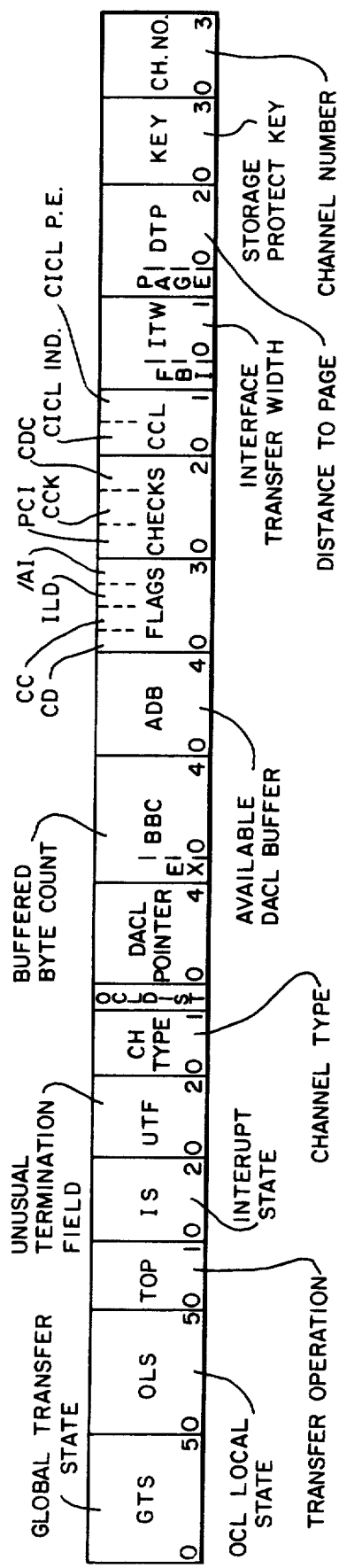
FIG.—7
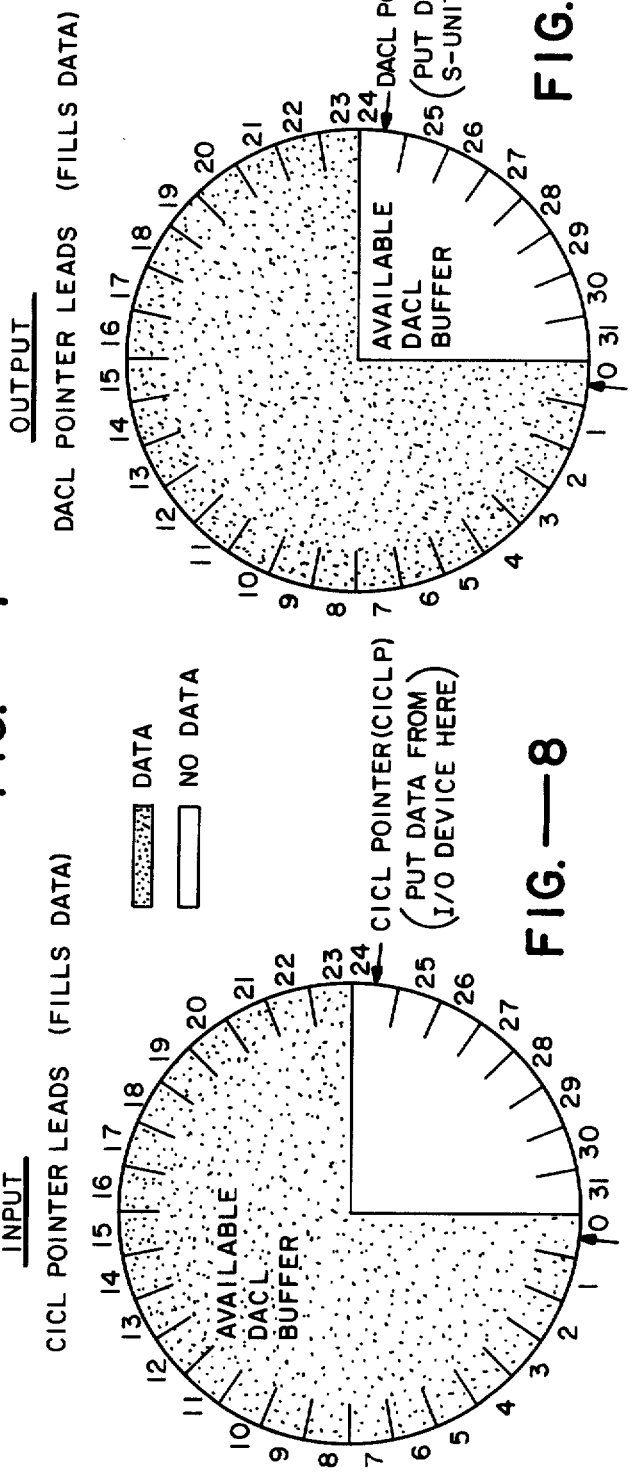
FIG.—8 INPUT
FIG.—9 OUTPUT

DATA PROCESSING SYSTEM HAVING A PLURALITY OF CHANNEL PROCESSORS

CROSS REFERENCE TO RELATED APPLICATIONS

1. DATA PROCESSING SYSTEM, Ser. No. 302,221, filed Oct. 30, 1972, invented by Gene M. Amdahl et al, assigned to Amdahl Corporation and now U.S. Pat. No. 3,840,861.

2. CONSOLE AND DATA PROCESSING SYSTEM, Ser. No. 693,552, filed June 7, 1976, invented by Richard L. Bishop et al and assigned to Amdahl Corporation.

3. DATA PROCESSING SYSTEM AND INFORMATION SCANOUT, Ser. No. 693,551, filed June 7, 1976, invented by Richard L. Bishop et al and assigned to Amdahl Corporation.

4. CLOCK APPARATUS AND DATA PROCESSING SYSTEM, Ser. No. 302,222, filed Oct. 30, 1972, invented by Glenn D. Grant, assigned to Amdahl Corporation, U.S. Pat. No. 3,792,362, issued Feb. 12, 1974.

5. CHANNEL DYNAMIC ADDRESS TRANSLATION, invented by Bishop et al, Ser. No. 312,733, filed Dec. 6, 1972 and assigned to Amdahl Corporation.

6. DATA PROCESSING SYSTEM HAVING A COMMON CHANNEL UNIT WITH CIRCULATING FIELD, invented by Katzman et al, Ser. No. 417,256 filed Nov. 19, 1973, assigned to Amdahl Corporation, now U.S. Pat. No. 3,936,803.

BACKGROUND OF THE INVENTION

The present invention relates to the field of instruction-controlled digital computers and specifically to methods and apparatus associated with the channels within data processing systems.

In the prior art, channels have been architecturally defined as that part of the data processing system which serves control units associated with the systems input/output (I/O) devices. Channels have been independent and discrete apparatus having their own set of commands which enable the I/O devices to read and write data while the remainder of the system concurrently processes instructions not necessarily related to I/O devices. Each channel has had its own instructions in system storage which have been fetched and processed under supervisory program control.

Channels are generally of three types, selector, byte multiplexor, and block multiplexor. Selector channels and block multiplexor channels are generally associated with high-speed devices, while byte multiplexor channels are usually associated with low-speed devices. A plurality of I/O devices are connected to a channel through a control unit. Byte multiplexor channels and block multiplexor channels allow interleaved transfer of data from multiple devices attached to the same physical channel interface.

While channels function somewhat independently of instructions executed by the data processing system, the data processing system maintains supervisory control over the channel and I/O operations. Channels are therefore processors of information which have some independence from other system processors (e.g., I-unit) and hence increases the concurrency of the processing of information by the system.

While prior art apparatus has worked satisfactorily, there is a need for improved channel apparatus which makes more efficient use of modern high-speed technologies. Whereas I/O devices operate at comparatively limited speeds which limit the maximum data rate over a channel, frequently due to mechanical limitations, and whereas electronic circuits operate at much higher speeds, those circuits desirably should be shared by a plurality of I/O devices in order to make more efficient use of their high speed capabilities. In prior art channel structures in which channel apparatus has been dedicated on a per channel basis, the circuits in one channel have not been readily shared with other channels.

SUMMARY OF THE INVENTION

The present invention is a data processing system including system storage and a channel unit for transmitting data, through control units, between input/output devices and main storage, over a plurality of channels.

In accordance with one embodiment of the invention, the channel unit of the present invention includes a channel store for storing information, including the data to be transferred over the channels. Additionally, the channel unit includes a channel state memory having a group of storage locations allocatable to each channel. The state memory includes for each group a first location for storing a count to designate a remaining transfer length where the remaining transfer length specifies a number of bytes of data remaining to be transferred over an associated channel. Also included in the state memory are second locations for storing a pointer for defining a location in the channel store and third locations for storing an availability number specifying the remaining locations in the channel store.

The channel unit also includes a first processor, common to all of the channels, for controlling the transfer of data between the channel store and system storage, the first processor including means connected to the state memory for accessing the first, second and third locations for each channel, including means for transferring data between the channel store and main storage by a first transfer amount, including means for changing the availability number in one direction by an amount equal to the first transfer amount.

The channel unit also includes a second processor, common to all of the channels, for controlling the transfer of data between the channel store and the input/output devices, the second processor including means connected to the state memory for accessing the first, second and third locations for each channel, including means for transferring the data between the channel store and the input/output devices by a second transfer amount, the second processor including means for changing the availability number in a direction opposite the one direction by an amount equal to the second transfer amount.

In accordance with the above summary, the channel unit of the data processing system includes one processor for controlling transfers of data between channel storage and system storage and another processor for controlling transfers of data between input/output devices and channel storage.

Additional objects and features of the invention will appear from the following description in which the preferred embodiments of the invention have been set forth in detail in conjunction with the accompanying drawings.

Additional objects and features of the invention will appear from the following description of which the

TABLE OF CONTENTS

Topic Heading
BRIEF DESCRIPTION OF THE DRAWINGS
DETAILED DESCRIPTION
Overall System — FIG. 1
Channel Unit — FIG. 2
Channel Unit — FIG. 3
C-Unit Channel Data Manipulator — FIG. 4
C-Unit Channel Control Logic And State Memory — FIG. 5
Description of Fields Within the Shifting Channel State (SCS)
  A. The Global Transfer State (GTS)
  B. The OCL Local State (OLS), 6 bits
  C. Transfer Operation (TOP), 2 bits
  D. Interrupt State (IS), 3 bits
  E. Unusaual Termination Field (UTF), 3 bits
  F. Channel Type (CH. TYPE), 2 bits
  G. OCL Distinguisher (OCL DIST.), 1 bit
  H. Data Access Control Logic Pointer (DACLP), 5 bits
  I. Buffered Byte Count (BBC)
  J. Available DACL Buffer (ADB), 5 bits
  K. Flags, 4 bits
  L. Checks, 3 bits
  M. CICL (CCL), 2 bits
  N. Interface Transfer Width (ITW), 3 bits
  O. Distance to Page (DTP), 4 bits
  P. Storage Protection Key (KEY), 4 bits
  Q. Channel Number (CH. NO.), 4 bits
Data Buffer Control
Topic Heading
  Channel Number Generator
  OCL IM LOGIC CHART
  Channel Number Registers
  OCL PROCEDURE "WORK 1" STATE
  I/O OP NOW
  Data Access Control Logic — FIG. 6
  CHANNEL UNIT OPERATION
  CHART I — Short Sequence
  CHART II — Long Sequence
  Controller Interface Control Logic (CICL)
  Start to Remote Interface Sequencer
  *ADB Generation & Control
  *Available DACL Buffer (ADB)
  + ADB Operand Generation
  Example of ADB Generation
  (−) ADB Operand Generation
  ADB Ingating to SCS
  Channel Local Store (LCS) Addressing
  Control Accessing
  LCSAR Bit Generation for Control Accessing
  Data Accessing
  LCSAR Bit Generation for Data Accessing
  LCSAR PRIORITY

BRIEF DESCRIPTION OF THE DRAWINGS

FIG. 1 depicts a block diagram of the overall data processing system of the present invention.

FIG. 2 depicts a schematic representation of the channel unit of the present invention.

FIG. 3 depicts a further detailed schematic representation of the channel unit of the present invention.

FIG. 4 depicts a schematic representation of the data manipulator which forms a part of the channel unit of FIG. 3.

FIG. 5 depicts a further detailed schematic representation of the channel control logic which forms a part of the channel unit of FIG. 3.

FIG. 6 depicts a schematic representation of the data access control logic which forms a part of the channel control logic of FIG. 5.

FIG. 7 depicts a representation of the field in the SCS.

FIG. 8 depicts a representation of SCS field for an input operation.

FIG. 9 depicts a representation of SCS fields for an output operation.

DETAILED DESCRIPTION

Overall System — FIG. 1

In FIG. 1, the data processing system of the present invention is shown to include a main store 2, a storage control unit 4, an instruction unit 8, an execution unit 10, a channel unit 6 with associated I/O and a console unit 12. The system of FIG. 1 operates under control of system instructions where an organized group of those instructions forms a system program. System instructions and the data upon which the instructions operate are introduced from the I/O equipment via the channel unit 6 through the storage control unit 4 into the main store 2. From the main store 2, system instructions and data are fetched by the instruction unit 8 through the storage control 4 and are processed so as to control the execution within the execution unit 10. The system of FIG. 1 is described in more detail in the above-referenced application entitled DATA PROCESSING SYSTEM which description is hereby incorporated by reference in the present specification for the purpose of teaching the overall general operation of a suitable instruction-controlled data processing system.

In addition to the above-referenced patent specifications, the publication "IBM System/370 Principles of Operation", SRL GA22-7000-3 published by IBM Corporation, is hereby incorporated by reference for the purpose of further teaching the general details of a data processing system compatible with the present invention.

CHANNEL UNIT — FIG. 2

In FIG. 2, the channel unit 6 of FIG. 1 is shown in schematic form connecting the I/O controllers 411' to the S-unit 4. The number N of channels is variable, but, for the present specification, N is 16 indicating 16 channels. The channel control logic CCL 403' operates to control the channel apparatus and the allocation of its different parts to specific channels. The channel control logic 403' includes a memory addressing and priority allocation unit 444 for determining which part of the channel control logic 403' will be allocated to which channel. Logic 403' additionally includes four control segments (parts) which are attached to the memory addressing unit 444. Although FIG. 2 shows division into four segments, other divisions are possible. Each of the control logic segments may be dedicated to specific functions where each segment operates independently of the others. In FIG. 2 state control 428' receives an instruction for a specific addressed channel from the I-unit on input bus 426. State control 428' then suitably addresses and modifies the one of the sixteen channel state store locations contained in the channel memories 448 which corresponds to the addressed channel. Subsequently, other control logic segments perform operations required to implement the instruction from the I-unit. The operations typically include accessing the S-unit by S-unit access logic 430', control word processing by the op control 429' or transfer of data to a control unit 411'. Typically, each logic segment 428', 429', 430' or 432' will itself modify the channel state store, in the channel memories 448 as it performs its operations. These operations typically require accesses to other channel memories contained in channel memory 448.

The input from the I-unit 8 of FIG. 1 via line 426 is derived from the effective address register (not shown) of that I-unit where, at appropriate times, a channel number (four low-order bits of an 8-bit byte) are generated designating, in a 16 channel system, which one of 16 channels is to be currently processed. The channel specified on line 426 is processed by different channel unit parts at different times. For a given transfer, the state control logic 428' receives the command and channel number from the I-unit unit and modifies the channel state store location associated with that channel, such that other control logic segments perform coordinated actions. In the 16 channel example, the channel state memory includes 16 locations and the particular one associated with the channel specified on line 426 is addressed by the circuitry 444.

The operations performable by the channel unit 6 of FIG. 1 include transfers of information between the S-unit 4 and the channel memory 448, and transfers of information between the channel memory 448 and I/O devices through the I/O control units 411'. Transfers between the S-unit and the channel memory 448 are under control of the S-unit access memory and controls 430'. Similarly, transfers between the channel memory 448 and the I/O controllers 411' are under control of the CTLR access memory and controls 432'.

Channel Unit — FIG. 3

In FIG. 3, the channel unit 6 represented in FIG. 1 and FIG. 2 is shown in further detail where the channel memory 448 of FIG. 2 is divided into three physical parts and the control logic is divided into four physical parts. The channel memory parts are the shifting channel state (SCS) store which includes stages SCS0 through SCS15 including the delay 431, the local channel store (LCS) 406 which includes a channel buffer store (CBS) and a subchannel state store (SSS) and the subchannel buffer store (SBS) 408. The control logic parts include the state controls 428, the OCL controls 429, the DACL controls 430 and the CICL controls 432. Additionally in FIG. 3, the channel unit-6 includes register circuitry 404, a data manipulator 405, and remote interface logic 407. The remote interface logic (RIL) 407 communicates with a plurality of I/O controllers 411. The C-unit 6 functions to interconnect I/O devices associated with the I/O controllers 411 with the remainder of the data processing system of FIG. 1.

The channel control logic (CCL) 403 includes, in accordance with the present invention, a shiftregister memory (SCS0 through SCS15) which is addressable for each channel of the C-unit 6. In FIG. 3, that memory includes state(STATE) locations 428 for controlling and specifying the state of an addressed channel, operation and control logic(OCL) locations 429 for specifying and controlling the operations of channels, data access control logic (DACL)locations 430 for controlling the accessing of data information from and to the S-unit of FIG. 1, and central interface control logic(CICL) locations 432 for accessing of information to and from the I/O controllers 411 through the remote interface logic(RIL) 407. In the present embodiment of the invention, the stages 428, 429, 430 and 431 are implemented by shift register stages which circulate their contents. In another embodiment, the storage in stages 428 through 431 is implemented with a random access memory. In each embodiment there is a location in storage associated with each channel and there is a method of accessing that location in memory.

In addition the channel control logic(CCL) 403 includes control 433 which communicate with the console unit 12 of FIG. 1 for carrying out console specified commands.

Command latch register 450 receives, on input bus, 13 bits of control data which are latched in command latch register 450 under a command on the latch control line 545 designated as C VALID. The bits in command latch register 450 are output on bus 455 where output bits 12 and 11 are input to the subchannel buffer store 408 for controlling store 408 in response to console commands.

Bit 10 from register 450 is input to the local channel store(LCS) 406 for controlling the local channel store on command from the console 12.

Bits 9, 8 and 7 from the register 450 are input to the registers 404 to control the registers with input information on bus 543.

Controls 433 include a channel clock network 454 which are inhibited or started under control of bits 6, 5 and 4 from register 450. Controls 433 additionally include an initial program load (IPL) mode circuitry 453 which controls the channel unit during the IPL mode of operation in response to bit 3 from register 450. Bit 2 from register 450 is communicated from the register 450 as an input to stage SCS15 of the state stages 428. Bit 1 of the register 450 is input to the register access controls 452 which controls the loading of the register circuitry 404 via the input bus 543. Bit 0 of register 450 is input to re-set controls 451 which operate to reset the C-unit circuitry 6 in response to the bit 0 of the command register 450.

In FIG. 3, the registers(REG) 404 of the C-unit of FIG. 3 are shown in further detail. The registers 404 include a 32-bit storage unit address register(SUAR) 464, a 32-bit storage unit data register(SUDR) 465, a 32-bit working register(WR) 466, a 13-bit local channel store address register(LCSAR) 467 and a 32-bit local channel store fetch data register (LCSFDR) 468. The WR register 466 receives information from the S-unit via input bus 394 and has its output connected via bus 424 as an input to the channel data manipulator (CHDM) 405. The WR register 466 also has an input derived from the LCS FDR register 468 and from the sub-channel buffer store (SBS) 408 via bus 423. The data path widths have been, for simplicity in this specification, given generally, ignoring parity bits which are present in a conventional manner. For example, for 32 bits, 4 bits of parity are present one per 8-bit byte.

The SUAR register 464 also receives an input from the LCS FDR register 468 and provides its output to an address decrementer (DECR) 435 which has an input on bus 353 which connects as an input to the buffer address register (not shown) in the S-unit. The SUAR register 464 in cooperation with the decrementer 435 is operative to specify the address within the store unit at which information is stored or fetched by the C-unit 6.

The SUDR register 465 is operative to store data to the storage unit via byte mover 436 and output bus 358.

The data fetched on bus 394 into the working register 466 or stored via bus 358 is done at the location in the storage unit specified by the address on address bus 353.

Information fetched from the storage unit and stored in the WR register 466 is transmitted via bus 424 to the channel data manipulator 405. Data from the channel data manipulator is received back via bus 425 and stored in the data manipulator out register (DMOR) 437. The register 437 has its output connected as an input to the data handling register (DHR) 439 which in turn has its output connected as an input to the local channel store (LCS) 406 and the subchannel buffer store (SBS) 408. Additionally, the DHR register 439 has an input from the interface logic data register (ILGDR) 438. The register 438 is connected to receive via its input bus 415 data from the remote interface logic (RIL) 407.

The remote interface logic 407 shown in FIG. 3 connects to the I/O controllers (control units) 411 and accordingly, the transfer of data into the data processing system from I/O devices is through the ILGDR register 438. When data is received into the registers 404 through the remote interface logic 407 it passes through the data register 438 to the local channel store 406 or the subchannel buffer store 408 before being further transmitted to the data processing system. When information is to be transmitted from the registers 404 out to I/O devices, the information is accessed from the local channel store via bus 421 and it is latched in the local channel store fetch data register 468, the output of which connects as an input to the ILPDR register 440. From the register 440, data to be transmitted to an I/O device is selected one or two bytes at a time from register 440 by byte selector 441. The output bus 416 from selector 441 includes 16 bits of data, two 8-bit buses (plus parity), which are connected as an input to the remote interface logic 407.

In summary, the registers 404 are operative to store data fetched from the S-unit via bus 394 or to store data into the S-unit via bus 458 at an address location in the S-unit specified by the address on bus 353. The information transferred between the registers 404 and the S-unit is also stored in the local channel store 406 or the subchannel buffer store 408 via buses 419 at an address specified by bus 420 and is accessed back into the registers 404 from those stores via buses 421 and 423. For data transfers between the registers 404 and I/O devices, information is output through the remote interface logic on bus 416 and is input to the registers 404 from the remote interface logic.

C-UNIT CHANNEL DATA MANIPULATOR — FIG. 4

In FIG. 4 the channel data manipulator 405 of the C-unit of FIG. 3 is shown in further detail. The data manipulator 405 receives the 32-bit input on bus 424 which connects to many locations within manipulator 405. Specifically, the input bus 424 connects as an input to the status registers 476, to the flag bits 477 and to the command register 446.

The status register 476 functions to hold status information concerning the operation of the registers and channels within the C-unit 6 of FIG. 3. Registers 476 have an input to the inselected gates 487 and form a part of the input to the OCL 429 as part of the bus 498. The flags 477 function as storage devices for indicating when certain functions have occurred and similarly have an input to the OCL via bus 498. The command register 446 functions to latch command words and make them available through gate 487. Also, the register 446 contents is recoded into a more convenient format, in recode logic 478 and is then connected as an input to the OCL via bus 498.

Additionally, the input bus 424 connects to the subchannel state logic 482 which functions to control and analyze information related subchannel information stored in the subchannel state store(SSS) which forms part of the local channel store 405 by causing SSS accesses based on the successively incremented contents of the device address register 479. The state logic 482 seraches the information on bus 424 for the highest priority subchannel. The subchannel state logic 482 communicates with the OCL an input to the OCL on bus 497 and receiving an output from the OCL on bus 499. Additionally, the subchannel state logic 482 responsive to the information on bus 482 and in the device address register 479 establishes a priority which is provided as an input to the inselect gates 487 for storage in the subchannel state locations of the local channel store 406.

Bus 424 also connects as an input to the device address register 479 where that register is employed to specify which device is to be processed under control of C-unit of FIG. 3. Device address register 479 is also loaded directly from the effective address register (EAR, not shown) on bus 426. The device address on bus 426 input to register 479 is eight bits. Those eights bits along with four higher order bits, for specifying the channel number, are input on bus 426 to the control multiplexor 704 in the state logic 428 of FIG. 6.

The device address register 479 is updated in increments of eight by the +8 incrementer 480 which receives an output from register 479 and forms a new input to the register 479. A comparator 481 receives an input from the register 479 and from the input bus 424 for detecting when the device address register 470 specifies the same device which is identified on bus 424. The results of the comparison in comparator 481 are stored in a register 486 which has its output connected to the OCL as part of bus 498.

Bus 424 also serves as one input to the data manipulator 483. Adder 483 also receives inputs from the data access control logic (DACL) on buss 495 for use in connection with data transfers between the S-unit and channel memories. Adder 483 has its output connected to the inselect gates via bus 492 for gating mainstore addresses and data counts into the local channel store 406 and the subchannel buffer store 408 of the channel memories where they are available to be accessed in connection with transfers of information. The adder of 483 also receives an input from a backup generator 491 which under control, via input bus 497, of the OCL functions to correct the address within channel memory at termination of procedures in connection with a channel.

In FIG. 4, the data manipulator adder (DM ADDER) 483 receives an input from the buffer byte count select (BBC SEL) circuitry 474. The circuitry 474 receives a 5-bit buffered byte count (BBC) which is the low-order five buts of the total 16-bit count field. The count field defines the total number of bytes of data to be transferred between the channel unit and the storage unit. In most instances, the buffered byte count (BBC) is received from the DACL action register 736 on line 460. Under some conditions when errors or other interruptions have occured, the buffered byte count is received from the OCL on line 461. The circuitry 474 also can select information from the bus 424 which is derived from the working register 466 in FIG. 3. During the start-up sequence and whenever a borrow is required from the high-order bits of the count field, the working register in FIG. 3 is loaded with the count field. During start-up before any byte transfer, the count field is input to the right-hand port of the adder 483. At other times during the processing when the high-order field of the byte count must be updated, the high-order bits are obtained from the working register 466 and the low-order bits (buffered byte count) are obtained from line 460 and together are input to the right-hand port of adder 483. The transfer length received is usually four since that is the maximum number of bytes that can be sent to the storage unit at a time. Also this amount must be subtrated from the count field (and therefore BBC) on each storage unit transfer.

The left-hand port of adder 483 receives the actual byte transfer length (TL) which under usual circumstances is four signifying a four-byte transfer. The actual byte transfer length is subtracted from the remaining portion of the count field in added 483 under the control of the data manipulator functional control (DM FCN CTL) 490.

The output 492 from the adder 483 includes the new remaining count. During a start-up operation, nothing is subtracted from the initial count field and therefore the total count field appears on bus 492. A short sequence occurs during the processing to update the buffered byte count (low-order five bits) when a borrow from the high-order bits is not required. In the short sequence, the updated buffered byte count appears on the bus 492 and the high-order bits are ignored. A long sequence occurs when it is necessary to borrow from the high-order bits which are first fetched from the channel store to the working register 466. The high-order bits from the working register together with the buffered byte count (low-order bits) from the select circuitry 474 are input to the adder 483. The actual transfer length is subtracted to produce on the output bus 492 new remaining count.

The output from the adder 483 has the bufferered byte count (five low-order bits) output on bus 427 to the DACL result register 737. Also, the eleven high-order bits are input to the extended bit calculator(EX CAL) 471. The calculator 471 includes an 11-input OR gate (not shown) which detects the existence of a logical 1 in any high-order bit of the count field. The output from the OR gate is selected whenever a new EX select signal appears on line 456 and appears on line 418. In an absence of a signal on line 456, the old value of Ex on line 457 is retained and output on line 418. The value of EX on line 418 is defined as the new value and it is output directly to the DACL result register 737 and it is also latched into the buffered byte count register(BBCR) 470 along with the new value of the buffered byte count from bus 492 at a time when the OCL provides a latch signal on line 462.

The particular addition or function performed by the adder 483 is specified by the data manipulator function controller 490 which has control functions specified by the operation control logic OCL on input bus 496 from the control point decode 706 of the OCL. The six inputs on bus 496 from the OCL are correct count, backup count, correct data, backup data, increment by four, and increment by eight. The input on lines 417 from the DACL specifies whether to add or subtract.

The DMOR inselect gates 487 produce the outputs on the 32-bit bus 425 which serves as an input to the data manipulator output register 437 in the register unit 404 of FIG. 4. The contents of the 32 bits are selected and formulated under the control of selection controls 488. Selection controls 488 select information from the input bus 424, from the subchannel state logic 482, from the status registers 476, from the device address register 479, from the data manipulator adder 492, from the command register 446, and from the input bus 475.

The input bus 475 to the inselect gates 487 receives eight bits each on bus 475 consisting of respectively channel number information, gated flag register information, and channel status information. Additionally, bus 475 receives four bits of data relating to new subchannel state information on bus 497 from the OCL. Also bus 475 receives input information from bus 495 derived from the state calculator 703 of FIG. 6 via bus 495.

C-Unit Channel Control Logic And State Memory - FIG. 5

The channel control logic(CCL) 403 within the FIG. 3 apparatus is shown in further detail in FIG. 6. In FIG. 5, the state 428, the operation control logic(OCL) 429, the data access control logic(DACL) 430 and the central interface control logic(CICL) 432 form the major parts of the channel control logic which cooperate with the channel state memory. Each of those parts is allocatable to one channel at a time and each may be allocated to different channels than the others.

The channel state memory is comprised of shift register stages 710, one for each channel. Shift register stages 710 comprises a shifting channel state (SCS) memory which determines the status of each channel, and signifies which channel is available for allocation to parts of the channel control logic(CCL). The sixteen stages 710 identified as SCS0, SCS1, . . . , SCS15 each, at any given point in time, contain information associated with a corresponding unique one of the channels identified as channels CH0, CH1, . . . , CH15. During an initial cycle at one point in time, SCS0 contains information relating to CH0, SCS1 contains information associated with CH15 and so forth until SCS15 contains information associated with CH1. During the next clock cycle, SCS0 contains information associated with CH1, SCS1 contains information associated with CH$\phi$. With each subsequent clock cycle, the channel information is stepped through the stages 710 in a conventional shift register fashion. After 16 cycles the information is again located as in the initial cycle.

DESCRIPTION OF FIELDS WITHIN THE SHIFTING CHANNEL STATE (SCS)

As mentioned, the Shifting Channel State (SCS) is a set of sixteen shift registers, stages 0 through 15. Each channel's state information occupies a position and shifts one stage each machine cycle in ring fashion. A given channel currently in stage 0 will reappear there sixteen machine cycles later.

The channel state information defines the I/O process states and the control and error information for each channel. The Operations Control Logic, Data Access Control Logic, and Controller Interface Control Logic have access to this information at specific points along the SCS path. This allows processing of all sixteen channels on a time-shared basis.

A. The Global Transfer State (GTS)

This six bit field defines the Controller Interface Control Logic (CICL) state for a channel. The six bits are interpreted octally, and the GTS states are numbered 00 to 77.

B. The OCL Local State (OLS), 6 bits

This field decodes octally and represents the current Operations Control Logic (OCL) State for a Channel. Major defined States are as follows:

| State | OLS Bits 012345 |
|---|---|
| OCL Idle | 101E00 |
| Initial Select | 100ETT |
| SIOF | 1100TT |
| Chain | 111000 |
| Halt | 111010 |
| Transfer | 111100 |
| Wait, Chain Data | 0CPPPP |
| Contigency Hold | 1101TT |

Note: The "E" bit set indicates a Channel or interface control check has been detected before returning a condition code and releasing the I-Unit during execution of an I/O instruction.

The TT field in Initial Select and SIOF are initialized from the interface timer and used for detecting an interface timeout.

The TT field of Contingency Hold is initialized from the contingency hold timer.

The CPPPP field in Wait Chain Data is a copy of the CICL last byte pointer saved during prefetching.

The OLS field defines the internal state of the Operations Control Logic (OCL). The fundamental difference between the Global Transfer State (GTS) and OLS is a state within OCL alone, while GTS concerns both OCL and the Controller Interface Control Logic (CICL) and can be transitioned by either. The purpose of OLS is to assign a separate state to each control step of OCL for a particular TS. For example, when GTS is INITIAL STATUS state, OLS differentiates as to whether the state if initiated by a START I/O (SIO) or Command Chain.

C. Transfer Operation (TOP), 2 bits

The Transfer Operation field contains the type of data transfer operation specified by the Channel Command Word (CCW).
00 Test I/O
01 Output or Control
10 Input
11 Input Backward

D. Interrupt State (IS), 3 bits

This field contains the Interrupt State of the channel. It does not change when subchannels are exchanged. The Interrupt states of all subchannels allocated to a particular channel are stored in the Subchannel State Store (SSS). The IS field reflects the highest priority Interrupt State of these subchannels. The eight states represented by this field are listed from highest to lowest priority as follows:

| | |
|---|---|
| 010: | Fatal Control Check. A control check has been detected in the channel. |
| 111: | Hardware Check. The channel contains a pending interrupt due to a hardware malfunction. |
| 110: | Primary Interrupt. A "channel end" interrupt is pending in the channel or Subchannel. |
| 100: | Secondary Interrupt. There exists an asynchronous interrupt that does not include "Channel End". Secondary status is not stored in the channel, but is held as pending in the I/O device. |
| 011: | Channel Available. There is a "channel available" interrupt pending. This applies to Block Multiplexer channels only. |
| 001: | None. There are no pending interrupts in the channel or subchannels. |
| 000: | SSS not scanned. This code shows that Interrupt State is not known, because Subchannel State Store (SSS) has not been scanned. This will occur after an interrupt has been processed and will remain until the Operations Control Logic (OCL) can begin a scan. |

E. Unusual Termination Field (UTF), 3 bits

This three bit code represents a condition that terminates data transfer for some unusual conditions. If there should be more than one unusual condition, the condition for which a higher value is assigned is set.

| | |
|---|---|
| 000: | Okay. (No termination of data transfer.) |
| 001: | Halt. This is set upon reception of a Halt I/O Instruction. |
| 010: | Protection Check Imminent. |
| 011: | Program Check Imminent. Note: The above two conditions are set when either Protection Check or Program Check is detected for a prefetched command or data in Chain Data processing for output operation. These conditions are converted to the real checks when the I/O operation condition proceeds to the new command, or when the protection boundary is crossed. |
| 100: | Protection Check. |
| 101: | Program Check. |
| 110: | Interface Control Check. Error detected on the I/O Interface. |
| 111: | Channel Control Check. Error detected on control operation internal to the C-Unit. |

F. Channel Type (CH. TYPE), 2 bits

This code represents the type of Channel. FIGS. 1–6 shows how the channel type is determined using information from the Channel Address Store (CAS). The two Channel type bits have the following meaning:

| | |
|---|---|
| 00: | Byte Multiplexor |
| 01: | Block Multiplexor |
| 10: | Selector Channel |
| 11: | Not Installed |

G. OCL Distinguisher (OCL DIST.), 1 bit

Is set if the OCL goes through the OCL Chain Command flow before entering the Start I/O Fast (SIOF) flow. This provides the OCL with a method of distinguishing whether SIOF was entered from a start I/O fast instruction or through the Chain Command flow.

The OCL distinguisher bit is also used during a Chain Data Operation. In this case, the bit is turned on when CICL pointer surpasses the CPPPP (last byte pointer of current CCW).

In either of the cases described above, the distinguisher bit is set in SCS stage 1 by the OCL.

H. Data Access Control Logic Pointer (DACLP), 5 bits

The DACLP points to the next data byte that the DACL will access in the Channel Buffer Store.

I. Buffered Byte Count (BBC)

BBC bits 0–4 are the low order five bits of the byte count from the Channel Word (CCW). During fetching of the CCW the Operations Control Logic (OCL) copies the low order five buts from the CCW count field into the Shifting Channel State.

J. Available DACL Buffer (ADB), 5 bits

ADB is the number of data bytes, or data locations available for the DACL to process.

ADB is a measure of buffer stress.

CICL adds to the stress (ADB).

DACL subtracts from the stress (ADB).

ADB of 0 is maximum stress on output, and minimum stress on input (data buffer empty in both cases).

ADB represents two things:

1. On input, ADB represents fullness of the LCS data buffer, and is the number of data bytes in the buffer. 2. On output, ADB represents emptiness of the data buffer, and is the number of byte locations which are empty in the buffer.

ADB is a measure of data buffer stress — the greater ADB the greater the stress. The Controller Interface Control Logis (CICL) increases the stress; the Data Access Control Logic (DACL) relieves this stress.

On an input operation, an Available DACL Buffer (ADB) of 0 means no bytes are in a channel data buffer and that the buffer is at minimum stress. As bytes are received from the I/O device, CICL puts them into the data buffer and increases the ADB — the data buffer becomes more stressed. And, as the DACL removes these bytes from the data buffer and sends them to the S-unit, the DACL reduces the ADB — the data buffer becomes less stressed.

On an output operation, an Available DACL BUffer (ADB) of 0 is also an empty buffer. However, the data buffer is at maximum stress because the CICL has no available data to transfer to the I/O device. As DACL puts data into the buffer, the DACL decreases the ADB, and the data buffer becomes less stressed. And, as the Controller Interface Control Logic (CICL) removes this data, the CICL increases ADB which puts more stress on the data buffer.

By way of example, picture a data buffer on an output operation. The DACL decreases ADB and the CICL increases ADB. If four bytes are put into the buffer by the DACL, the ADB is reduced from 0 (32 empty positions) to 28 (29 empty positions). Some data is then available for the CICL, and the buffer becomes less stressed. As the CICL sends a byte of the I/O device, the ADB is increased to 29 (29 empty buffer locations), and the buffer become more stressed.

K. Flags, 4 bits

Chain Data (CD) is from the Channel Command Word (CCW) flag field. It is saved in the SCS by the initialize SCS statement (seen in the OCL flow charts).

Chain Command (CC) is from the CCW flag field and is saved in the SCS by the initialize SCS statement (seen in the OCL flow charts).

Illegal Length Detected (ILD) is set into SCS 4 or C when the Controller Interface Control Logic (CICL) has detected an incorrect record length.

Skip/Program Controller nterrupt (SKIP/PCI) is used to indicate a sjip on an input operation (data transfer suppressed) or a Program Controlled Interrupt for a chain data output operation. If a CCW is pre-fetched during data chaining with its PCI flag on, the PCI-Pending flat is set. When the I/O transfer is initiated for this CCW (i.e., previous CCW completed), this bit is transferred to the PCI flag.

L. Checks, 3 bits

Program Controlled Interrupt (PCI) — This bit is set if the Channel Command Word contains the PCI flag. A PCI interrupt is presented to the I-Unit when this bit is on. Note: Though this bit is located in the Check field of SCS, it is logically part of the Flag field in SCS.

Chaining Check (CCK) indicates a Chaining Check has occurred. The detection is done by the DACL priority logic. When Chaining Check has been detected, the CCK bit is posted into SCS by the DACL priority logic.

Channel Data Check (CDC) indicates that the DACL or CICL has detected a channel data check.

M. CICL (CCL), 2 bits

CICL Indicator (CICL IND.) is written into SCS 0 or 8 on two occasions:

1. During initial selection if the address from the I/O device (at address-in time) matches the address sent to the I/O device (at address-out time).

2. During initial selection is the initial status (at status-in time) was equal to 0.

CICL Parity Error (CICL P.E.) is written into SCS 1 or 9 if the CICL either:

1. Detects a parity error in interface data going into Local Channel Store (LCS), which is detected in the Data Holding Register (DHR) or, 2. a parity error is detected on data fetched from LCS, which is detected in the Local Channel Store Fetch Data Register (LCSFDR).

N. Interface Transfer Width (ITW), 3 bits

Four Byte Interface (FBI) is used to indicate this channel is operating as ½ of a channel pair used for a 4-byte interface operation.

Bits 0–1 have two functions:

1. Bit 0 is used to signal command retry to the OCL during status-in, if the status is non-zero. This is done be transferring the mark-in 0 bit from the I/O interface to ITW bit 0.

2. At other than status time, bits 0–1 indicate the logical width of the I/0 interface as follows:

00 — 1 byte wide
01 — 3 bytes wide
10 — 2 bytes wide
11 — 4 bytes wide

O. Distance to Page (DTP), 4 bits

Page bit — when on indicates the channel is performing either channel indirect addressing or a logical operation. Bits 0—2 have the following meaning.

000 — Page Boundary more than 4 bytes away.
001 — Page Boundary one byte away.
010 — Page Boundary two bytes away.
011 — Page Boundary three bytes away.
100 — Page Boundary four bytes away.
101 — Page Boundary reached.
110 — Not used.
111 — Not used.

P. Storage Protection Key (KEY), 4 bits

These bits contain the storage protect key from the Channel Address Word (CAW). The field is initialized by the OCL. See initialize SCS in OCL flow charts.

Q. Channel Number (CH. NO.), 4 bits

These bits identify the channel to which the SCS state information belongs, within the displayed stage. (See Channel No. Generation)

Data Buffer Control

The Channel Buffer Memories include the Subchannel Buffer Storage (SBS) and the Local Channel Store (LCS). The SBS retains control and status information for inactive subchannnels. The LCS is divided into three logically separate areas, Channel Buffer Store 1 (CBS I) the Subchannel State Store (SSS), and Channel Buffer Store 2 (CBS II). CBS I, and CBS II contain control, status and data buffer areas for the sixteen channels. The SSS stores the functional states of all 1,024 available subchannels.

There are 16 data buffers with the Channel Buffer Storage (CBS) including stores 407 and 408 of FIG. 5., one for each channel. The Controller Interface Control Logic (CICL) 432, and the Data Access Control Logic (DACL) 430 control these buffers. The DACL 430 controls movement of data between the S-unit 4 and the CBS data area. The CICL 432 controls movement of data between the CBS and the I/O devices through controllers 411. On input, the CICL 432 fills the data buffers while the DACL 430 empties them. On output, the opposite is true, the DACL fills and the CICL empties.

Each buffer contains 32 one byte locations; however, addressing is done on one word boundaries. The buffers can be visualizes as circular queues. Address wrap around is used so buffer operations are continuous. That is, when the DACL or CICL address the last word (28), they continue at address zero.

Two points are used to keep track of buffer accessing: The DACL pointer and the CICL pointer and each points to one of the 32 one byte locations.

The DACL pointer is a 5-bit pointer kept in SCS. (There are 16 DACL pointers, one for each channel.) And, the pointer is used by the DACL to generate a CBS address when accesing the data buffer.

The CICL pointer is not kept in SCS. The CICL pointer is generated within the CICL by adding the 4-bit Available DACL Buffer (ADB) field from the SCS to the DACL pointer. Like the DACL, the CICL uses it's pointer to generate CBS addresses which are loaded into the Local Store Address Register (LCSAR) 467 when a CBS access is needed.

For an input operation, the following is a description of the pointers referred to in FIG. 8. Both pointers start at zero. The CICL collects data, one byte at a time, stores it in CBS per the CICL pointer, and advances the pointer, one byte count. In FIG. 8, the CICL has loaded butes 0 to 23 and points to the next location, byte 24. The DACL accesses data in CBS per the DACL pointer, sends the data to the S-Unit, and updates the DACL pointer. In FIG. 8, the DACL pointer is at byte 0. In the first transfer, the DACL will transfer four bytes, bytes 0 to 3, so that the DACL pointer will be at byte 4 after a transfer. The CICL pointer leads the DACL pointer clockwise around the queue during input. As the CICL fills the buffer, LCS 406, the DACL empties it.

For an input termination, the CICL will finish data transfer before the DACL does. When there are less than 32 bytes of data left to transfer, EX bit goes off. With the EX bit off, BBC is the remaining byte count. The CICL will stop inputing data when the BBC=ADB and EX is off. At this time, the data buffer (LCS 406) contains all bytes necessary though the DACL hasn't completed transferring all bytes to the S-Unit. The DACL will stop sending data to the S-Unit when the BBC is decremented to zero and EX is off. Only the DACL decrements BBC; so, when BBC is zero, all bytes have been moved to the S-Unit.

For an output operation, the following description of the pointers referring to FIG. 9. Both the DACL and CICL pointers start at zero. The DACL fetches 4 bytes of data from the S-Unit, places them in CBS per the DACL pointer, and advances the pointer. In FIG. 9, the DACL has operated six times so the pointer is at byte 24. The CICL sends data to the I/O device and advances the CICL pointer. The CICL is only beginning and is at byte 0. Each transfer is one byte so the next location will be byte. The DACL pointer leads the CICL pointer clockwise around the queue. As the DACL fills the LCS buffer, the CICL empties it.

For an output termination, the DACL will finish the data transfer before the CICL does. When there are less than 32 bytes left for the DACL to fetch, the EX bit goes off. With EX off, BBC is the remaining byte count. The DACL will stop fetching data when the BBC is decremented to zero (and the EX bit is off). The CICL will stop moving data from the data to the I/O when ADB=BBC=0.

CHANNEL NUMBER GENERATOR

The Channel Number Generator is a 4 bit binary counter which is implemented as the channel number portion of SCS stage F. The 4 bit Channel Address is propagated, to SCS Stages 0, 1 and 2. Since these are the only stages where the SCS data is inspected or modified, the Channel Address portion of SCS drops after Stage 2. The nova generates the channel numbers displayed in the other SCS stages.

On power up this 4 bit binary counter, starts at a random state, then steps once each clock cycle, counting from O - F, and repeats continuously.

The low order bit of the number generator flips each cycle. This low order bit serves a double purpose in that it is also called the 'Odd Cycle Latch'. When the Latch is off the cycle is said to be 'even', when it is on, the cycle is said to be 'odd'. This latch has an input to the SU/LCS Mux to determine even/odd cycles in reference to CICL or OCL/DACL priority. The clock input (not shown) to each of the stages 710 is conventional.

The first part of the channel control logic (CCL) 403 is the state circuitry 428 which is responsive to the stages SCS15 and SCS0 of the channel state memory. Stage SCS15 receives an input from stage SCS14, an input from the command latch register 450 of FIG. 3 on line 712, and an input on line 542 derived from the console unit 12 of FIG. 1.

The information is SCS15, during any given clock period, provides an input to the state calculator 703 where the configuration calculation in accordance with patch wire inputs on lines 708 reestablishes the configuration of the channel units and stores the results in SCS0. Additionally, the state precalculator 703 provides through register 702 an input to the immediate priority logic 714 the state of the channel associated with the contents of SCS15. At the same time, the control multiplexing unit 704 receives the four bit channel address on input bus 426 from the EAR (not shown) of the I-unit of FIG. 1. Control multiplexor 704 additionally receives op code and interrupt information on bus 426 which is supplied through register 702 to the OCL immediate procedure logic 714. In addition to the input received from the I-unit via bus 426, control multiplexor 704 supplies control information back to the I-unit control via bus 716 for setting condition codes and indicating when operations specified by the I-unit are complete. The control multiplexor 704 receives that condition code and op complete information via inputs from the OCL immediate priority logic 714 and from the OCL procedure logic 719.

The information in stage SCS15 is gated in each cycle into stage SCS0 where it is latched for one cycle. Similarly, stage SCS15 receives and latches new information in each cycle from stage SCS14.

SCS0 provides a 46-bit input to the OCL immediate procedure logic 714. The OCL immediate procedure logic 714 waits for the circulating stage information in the stages 710 to circulate until the information for that channel specified by the four channel bits on bus 426 circulates to stage SCS1. When that addressed channel has its state information is SCS1, the logic 714 determines the operation which is to be performed. If the addressed channel as determined by the state circuitry 428 is otherwise idle, then the OCL 429 operates to copy the contents of SCS1 into the OCL staging register 721 (OCLSR). Simultaneously, the OCL immediate procedure logic 714 causes an "instruction" to be gated into the OCL immediate register 722 (OCLIR). Register 722 causes, through one of its outputs, the OCL result logic 725 to change the channel state information for the addressed channel, currently located in SCS1, from "idle" to "operation pending". The change from idle to pending occurs when the information in SCS1 is gated through the result logic 725 to the SCS2.

With the information in SCS2 indicating that an operation pending condition exists, the staging register 721 contains information on what that operation is along with information sufficient to initiate that operation. During this time, the I-unit is waiting for a signal back on lines 716 which will enable the I-unit to continue processing instructions within the instruction stream. The OCL procedure logic 719 with its input from the staging register 721 analyzes the contents of register 721 to initiate procedures which will access the channel memory (including the local channel store 406 and the subchannel buffer store 408). Those channel stores are accessed to obtain and latch the state of the addressed subchannel. The subchannel is identified by the data manipulator with its 8-bit, device number on bus 426. The OCL procedure logic 719 through the register (PRTR) 724 initiates sequences in the OCL sequencer 726. The OCL sequencer 726 includes sequential logic routines for carrying out control functions, through the OCL control point decode 706, which cause the registers 404, the data manipulator 405 and the four parts 428, 429, 430, and 432 of the channel control logic 403 to carry out their required functions.

When the procedure logic 719 has caused the sequencer 726 to initiate a specific procedure, procedure logic 719 is then in a wait state awaiting for completion of that procedure. When the logic 719 receives a signal on input bus 498 indicating that an initiated procedure has been completed, a decision is made as to what the next procedure, if any, is. When all of the procedures specified by logic 719 have been carried out, procedure logic 719 signifies that condition with a signal to the result logic 725. Result logic 725, thereafter when the associated channel information in staging register 721 also is shifted into the stage $SCS_2$ causing a change in the channel state information setting from "operation pending" to "initial selection".

In FIG. 5, the OCL 429 uses the OCL Result Register (OCLRR) 469, and the OCL Immediate Register (OCLIR) 722 to post new SCS information into SCS 2.

The OCLIR is used when it is possible to made one cycle decisions on the setting of certain SCS fields.

The setting of the OCLIR is determined by the OCL Immediate Logic 714.

The OCL Immediate Logic receives SCS information (GTS, OLS, etc.) from SCS 0 and control enable information (such as I/O OP NOW) from the Control Mux 104. This combined information is fed into the OCL Immediate logic during the cycle the channel is in SCS 0. The Immediate logic inspects this information and makes decisions on setting latches in the OCLIR. As the channel steps into SCS 1, the OCLIR latches are set. As the channel steps into SCS 2, the OCLIR latches control the posting of the specified SCS fields into SCS 2 through the result logic 725.

The OCL Immediate Logic/Register 722 can affect 7 fields of SCS:

1) UTF
2) GTS
3) DTP
4) IS
5) OLS
6) SKIP & PCI bits
7) DACLP

The following IM LOGIC CHART represents the input and output logic states of logic 714 and is constructed using conventional logic circuits.

OCL IM LOGIC CHART

PCI & SKIP

0 - No Change
1 - SET PCI & RESET SKIP

DTP

0 - No Change
1 - Set DTP to 0

UTF

00 - No Change
01 - Not Used
10 - Set UTF to 6
11 - Set UTF to 7

IS

00 - No Change
01 - Set SI to 1
10 - Set IS to 2
11 - Set IS to 3

GTS

00 - No Change
01 - Set GTS to 50
10 - Set GTS to 00

11 - Set GTS to 66 and DACLP to 0

OLS

00 - No Change
01 - Set OLS to IDLE
10 - Set OLS to TRANSFER
11 - Set OLS to DUMMY In FIG. 5, the OCL priority logic (OCL PRI LOGIC) 715 functions together with the OCL staging register (OCLSR) 721 to determine what procedure will be carried out by the OCL 429. The OCL 429 is capable of performing many different control procedures. As each new channel comes into SCS 0, the OCL priority logic 715 must determine whether or not that new channel needs to be serviced with a control procedure and whether the OCL 429 is idle or whether the requested procedure for that channel has a higher priority than other channels that have requested the services of the OCL 429.

The OCL staging register 721 functions under the control of the priority logic 715. The staging registers 721 includes one pair of latches for each of the initial procedures which can be carried out by the OCL 429. Each pair of latches is a master-slave combination of latches. The priority logic 715 interrogates the SCS 0 to determine if any of the procedures which can be carried out by the OCL 429 are being requested by the channel in SCS 0. If a request for a procedure is being made, then the master-latch corresponding to that procedure is set automatically in the register 721. Only one master-latch will be set at any one time. The master-latches in register 721 are clocked each cycle (by conventional means not shown) each time the SCS is clocked. The output of each master-latch feeds its corresponding slave-latch in the register 721. However, a trasfer occurs from the master-latch to the slave-latch only when priority logic 715 determines that a transfer should occur. The OCL priority logic is conventional logic for comparing the contents of the master-latches with the slave latches in register 721 to determine whether the procedure requested in the master-latches has higher priority than procedure in the slave-latches. The different procedures which the OCL 429 is capable of performing, and which will be discussed in connection with the procedure logic 719, all have preassigned priority. For example, procedures of a higher priority are given a higher number location latch and procedures of a lower priority are given a lower number location latch. The priority logic 17, therefore, is essentially a conventional comparator. If the master slave latch has a higher number than the slave-latch number, the comparator output from priority logic 715 clocks the slave-latches in the register 720 causing the higher priority procedure to be transferred into the slave latches. If the procedure identified in the slave latches already has an equal or higher priority, then no output is generated by the priority logic 715 and the previous procedure remains latched in the slave-latch. The contents of the slave latch in register 721 specifies the next procedure to be carried out by the procedure logic 719. While the priority logic 715 has been described as a simple comparator and gate control between master slave latches, other more intricate priority circuits can be employed in accordance with the present invention. For example, the basic priority comparison scheme between the contents of master-slave latches can be expanded by inhibiting the output from the comparator under certain conditions or alternatively forcing the transfer from the master to the slave latches even though the output from the comparator did not occur. The operation of the priority logic is that of a 2-bit state machine. There are four states to the state machine, namely, 00, 01, 10, 11.

The Staging Register (SR) state machine states are only significant when the Staging Register slave latches contain an OCL procedure request (SR full). The SR state machine determines whether the Staging Register slave latches should stay the same, or reset and allow a new request to be loaded from the Staging Register master latches.

The states are defined as follows:

State 00 - Over write the slave latches.

When SR full is on, this state indicates that the OCL procedure logic is busy performing an OCL procedure, but for some channel other than the channel in SCS 1.

This state is entered when:

1. OCL is not idle
2. The channel number in SCS1 does not equal the channel number in the OCL Action register 720 or the OCL Result Register 469. (This comparison is made when the channel is in SCS0, and latched for use next cycle, when the channel is in SCS1).

Action during state 00:

A comparison is made between the Staging Register master and slave latches to determine if the master latches have a greater priority than the slaves.

If the Staging Register master latches are higher in priority, the slave latches are clocked. This causes the current request to be reset, and the request in the master latches to be transferred to the slave latches. The slave latches set as the requesting channel enters SCS 2.

State 01 (channel number in SCS0 = channel number in slave latches):

This state indicates that the OCL procedure logic is bus performing an OCL procedure for some channel, the Staging Register slave latches are holding a request to be performed, and the channel currently in SCS0 is the same channel for which the slave latches contain a request.

At this point it is possible that the channel in SCS0 no longer requires an OCL procedure, or it requires a different procedure than before.

This state is entered when:

1. The OCL procedure logic is busy.
2. The Staging Register slave latches contain a procedure request that has not yet been accepted by the Procedure logic (Staging Register full).
3. The channel number in SCS0 is the same channel number that is currently in the Staging Register slave latches.

The Staging Register slave latches will be clocked and there are three possible results:

1. The channel in SCS0 no longer requests an OCL procedure. The Staging Register slave latch that is on will be rest, and SR full turns off.
2. The channel in SCS0 still requests a procedure, but a different one than previously. The current slave latch that was on is reset, and a new one is set to reflect the new request. SR full stays on.
3. The channel in SCS0 still requests the same procedure as before. The Staging Register slave latches are clocked, and the slave latch that was on remains on. SR full stays set.

State 10 (Keep SR full):

This state indicates that the Staging Register full latch should stay on even though the OCL procedure logic is idle.

Some of the OCL procedures require that SCS information be loaded into the Action register 720 from SCS1 before the procedure can be performed.

Normally, when the OCL procedure logic finishes a procedure and becomes idle, the request in the Staging Register slave latches is accepted by the procedure logic and SR full turns off, allowing the next procedure request to be transferred from the Staging Register master latches to the slave latches.

However, when the OCL procedure logic becomes idle and the request in the Staging Register slave latches require SCS information, the SR state machine goes to state 10. It remains in this state until the channel associated with the request reaches SCS 1. At this time, the Action register 720 is loaded from SCS 1 and SR full is reset.

This state is entered when:
1. OCL is idle (procedure logic not currently busy performing a request).
2. The Staging Register slave latches contain a request (SR full on).
3. The OCL procedure logic has not started performing the request because necessary SCS information has not been loaded from SCS 1 into the action register.

Action during state 10:
1. SR full is not allowed to reset.
2. The Staging Register slave latches are not allowed to change.

When the channel with rhe request in the Staging Register slave latches eneters SCS 0, signals are generated to allow the action register to be loaded from SCS 1 during the next cycle. At that time, OCL idle will go off.

State 11 (Set SR empty):

This state indicates that the request in the Staging Register slave latches will be accepted by the OCL procedure logic during the next cycle.

SR Empty will be set, allowing any requests in the Staging Register master latches to be transferred to the slave latches.

This state is entered when:
1. OCL is idle.
2. The Staging Register slave latches contain a request.
3. The request in the slave latches does not require SCS information from SCS1, or if it does, the information has already been loaded into the Action register.

Action during State 11:
1. SR full is reset.
2. If the Staging Register master latches contain a request, the Staging Register slave latches will be clocked, and set to reflect that request.

The OCL Priority Logic 715 typically includes a Staging Register Full/Empty latch (not shown) which refers to the Staging Register slave latches only. If the slaves contain a request that has not been accepted by the OCL Procedure logic, the latch is set. When the OCL Procedure logic finishes it's current operation, and becomes idle, certain conditions allow the OCL Procedure logic to accept the request in the slave latches and processing of that request begins. At this time the Staging Register Full latch is reset (and Staging Register Empty becomes active).

Normally, when the OCL Procedure logic becomes empty, the request currently in the slave latches is immediately accepted by the OCL Procedure logic. However, some Procedure request require that information from SCS be loaded into the OCL Action register before this Procedure can be accomplished (the path for SCS information is SCS1 to Action Register). When this occurs, the OCL Priority Staging Register Stage Machine goes to state 10, which inhibits Staging Register full from resetting until the channel making the request enters SCS 1. When a request in the slave latches has been accepted by the OCL Procedure logic, the Staging Register slave latches are logically empty (Staging Register Full is off). However, the current slave latch will not reset until a new slave latch is set.

The Staging Register Full latch is set when all of the following occur:
1. There is no request currently in the slave latches.
2. The channel in SCS 0 has a request for an OCL Procedure.
3. The channel in SCS 0 is not currently in the OCL action register or the OCL Result register.

The latch is reset when any of the following occur:
1. System master rest occurs.
2. Priority state machines = 11.
3. Priority state machines = 01 and there is no procedure request for the channel currently in SCS 1.

The latch is prevented from resetting when the Priority State Machine = 10.

CHANNEL NUMBER REGISTERS

There are four channel numbers maintained in registers in OCL and each are four bits wide. The channel numbers are the Channel Number for Staging Register master latches (CN-SM), Channel Number for Staging Register slave latches (CN-SS), Channel Number for Action Register (CN-AR), and Channel Number for Result Register (CN-R).

The channel numbers in the registers keep track of which channel is currently in each phase of OCL (Staging Register 721, Action Register 720, and Result Register 469. The registers are in a pipeline fashion.

The CN-SM channel number is clocked by normal clock and is loaded every cycle while the remaining channel numbers are loaded with their corresponding register as previously described.

The priority logic 715 of FIG. 5 typically includes a Channel Not in Procedure (CNIP) State latch (not shown). This latch indicates, when it is set, that the channel in SCS0 is neither being processed in the Action register 720, not being held in the Result Register 469 for posting into SCS2.

This latch informs the OCL Priority logic that the channel in SCS 0 can be placed in the Staging Register slave latches if:
1. The channel has a procedure request, and
2. The slave latches are available to accept a new request.

Each cycle this state machine is et or reset to reflect the condition of the channel in SCS0.

The priority logic 715 also typically includes an OCL Distinguisher latch which is set under two cases.
1. When OLS field in SCS0 equals chain. This allows the OCL to recognize that OLS entered SIOF from chain rather than from a SIOF instruction.
2. When the CICLP passes CPPPP during wait chain data. This enables OCL to place the proper CCW address into the CSW in the case of data transfer termination before the byte count reaches 0.

In FIG. 5, the OCL procedure logic (OCL PROC LOGIC) 719 includes a conventional state machine (not shown) such as a counter or register. The OCL Procedure State Machine consists of five states, namely, IDLE, WORK, WORK 0, WORK 1, and EXIT.

The State Machine is controlled by conventional control and decode logic in OCL PROC LOGIC 719 which is defined as follows in connection with the states.

The state machine is in IDLE qhen the OCL PROC LOGIC 719 is not busy performing an OCL procedure.

When the OCL priority logic 719 detects a procedure is being requested by a channel, the request is placed into the OCL staging register slave latches 721, and the SR FULL latch is turned on.

If the procedure request is a 'FETCH CAW', 'BACK UP CHAIN DATA', or 'DUMMY 1', the signal 'WAIT ACTION REGISTER' (WAAR) is activated. If the request is for any other procedure, 'WAAR' will be inactive.

Depending on the state of 'WAAR', the OCL procedure state machine will either:

1. Proceed to 'WORK' state on the next even cycle.

If the 'WAAR' is inactive and SR FULL is active, the OCL procedure state machine will go to the work state on the next even cycle.

2. WAIT for AR full, then go to 'WORK' state on the following even cycle.

If 'SR FULL' and 'WAAR' are both active, the OCL Procedure machine will remain in the IDLE state until 'AR FULL' becomes active, then go to the 'WORK' state during the next even cycle. 'WAAR' signals the OCL Procedure logic that the procedure request is one that requires SCS information to be loaded into the OCL ACTION REGISTER 720 before the procedure can be performed. When the requesting channel enters SCS 0, signals are generated to allow the ACTION REGISTER to be loaded with the necessary SCS information during the next cycle (when the channel is in SCS 1).

When the ACTION REGISTER has been loaded, the signal 'AR FULL' is generated and the OCL procedure state machine goes to the 'WORK' state during the next even cycle.

As the OCL procedure state machine steps to the 'WORK' state, four control signals are generated.

1. PRT CLOCK ENABLE (PRCE)

This signal allows the Procedure Transfer Register (PRT) 724 to be clocked. The signal SR FULL and the Procedure state machine not being in IDLE state enables the Procedure Start signal. This along with PRT CLOCK ENABLE sets the procedure (latched in the OCL STAGING REG SLAVES) into the PRT register.

2. START

This signal causes a conventional sequencer (not shown (such as a counter to leave the IDLE state, which allows the procedure logic to begin processing the procedure that is latched in the PRT register.

3. SCHRA CLOCK ENABLE

This signal allows the OCL action register 720 channel number to be loaded.

4. SET SR to EMPTY

This signal along with OCL procedure state machine IDLE state, sets OCL PRIORITY STAGING REGISTER STATE MACHINE to 11. This resets the SR FULL latch. SR FULL being off informs the OCL PRIORITY logic 719 that the procedure request in the Staging Register slave latches has been transferred to the PRT 724 and the slave latches are now logically empty.

The OCL procedure state machine being in WORK state allows the procedure latched in the PRT register 724 to be performed.

When the execution of the procedure is completed (e.g., counter reaches maximum count and resets), the OCL SEQUENCER STATE MACHINE enters the IDLE state, informing the PROCEDURE STATE MACHINE that the procedure has been performed.

When the OCL SEQUENCER enters the IDLE state, the PROCEDURE WORK state will reset if AR FULL is active. If AR FULL is not active, the WORK state remains set until AR FULL becomes active.

As stated previously, the first occurrence procedure may be performed before the OCL ACTION register is loaded with the channels SCS information from SCS 1. However, if a second procedure is to be performed, the SCS information is always required to be in the OCL ACTION register first. Therefore, the AR FULL signal must be present before WORK state is reset.

The OCL Procedure machine will step from "WORK" state to WORK 0 state when all of the following occur:

1. The Action register is full
2. The OCL SEQUENCER enters the IDLE state, signaling completion of the current procedure,
3. It is an ODD cycle
4. The procedure being performed is either:
   A. Store CSW2
   B. Fetch Subchannel State
   C. Send STW
   D. Fetch Device Status
   E. Fetch CCW1
   F. Fetch CCW2
   G. Fetch IDAW
   H. Translate
   I. Fetch CAW & PAR bit 0 is on If any of the other procedures are being performed the OCL Procedure State machine steps from WORK to WORK 1.

The above combination generates a "Delay" signal. This "Delay" Signal indicates that the OCL sequence logic needs two extra cycles (after the OCL SEQUENCER reches IDLE state). The LCS facilitates and the "O.K. to OCL" from the SU/LCS MUX will be necessary.

Action during "WORK 0" state.

"WORK 0" is a two cycle delay state, and no action is taken.

Reset of "WORK 0" state.

"WORK 0" state is reset on the next odd machine cycle after it sets.

OCL PROCEDURE "WORK 1" STATE

Set:

"WORK 1" state is set by one of two methods:

1. On the following ODD cycle after "WORK 0" is set, if "WORK 0" is entered.
2. On the same cycle that "WORK" state resets, if "DELAY TO OCL PROCEDURE" is inactive.

Action during "WORK 1" state.

"WORK 1" state indicates that an OCL procedure has been completed. If the signal "OCL PROCEDURE END" is active, this was the last procedure of a procedure string.

Example - Procedure string

F CAW
FCCW1

FCCW2
SAVE MODES (This is the last of the string)

At the end of each procedure, the OCL PROCEDURE STATE machine enters the "WORK 1" state. At the end of "SAVE MODES" procedure, the "OCL PROCEDURE END" signal will also be active.

The Exit State is entered when the last procedure of a procedure string has completed (OCL PROCEDURE END), and the OCL sequence machine is in the "WORK 1" state.

The Exit State is not allowed to be set if the OCL Result Register contains information that has not yet been posted to SCS (POST OCLRR active).

The Exit State is on for one cycle only. On the next cycle after Exit State, the OCL Procedure State Machine steps to IDLE, allowing a new procedure to be started.

When a channel requests an OCL procedure, it is possible that more than one procedure must be performed.

For example, when "I/O OP NOW" and SIO are active and the GTS=00, the "FETCH CAW" (FCAW) procedure is performed. After the CAW has been fetched, the "FETCH CCW1" (FCCW1) "FETCH CCW2" (FCCW2), and "SAVE MODES" (SVMD) procedures are performed. When "FETCH CAW" is finished, the logic automatically starts up "FETCH CCW1". When "FETCH CCW2" is finished, "FETCH CCW2" is automatically started. After "FETCH CCW2" is finished, "SAVE MODES" is started. When "SAVE MODES" begins, "OCL PROCEDURE END" signal is generated.

This signal (OCL PROCEDURE END) implies that the last procedure of a procedure string has been started.

When this last procedure is finished, the OCL procedure state machine enters "WORK 1", and the results of the combined efforts of the procedures are placed into the OCL Result Register and the latch "POST OCLRR" is turned on to signal that the OCL Result Register is full.

"PROCEDURE START" is generated when the "SR FULL" latch is on (indicating the staging register latches have a procedure request that has not been performed), and the OCL PROCEDURE MACHINE is in the IDLE state (indicating that no procedure is currently being performed by the OCL PROCEDURE logic).

The "PROCEDURE START" signal allows the procedure in the STAGING REGISTER slave latches to be transferred to, and latched in, the PRT register.

The signal START TO PROCEDURE SEQUENCER is generated when the OCL PROCEDURE STATE MACHINE is set to WORK state, or when WORK 1 is active and OCL PROCEDURE END is active.

This signal sets the OCL SEQUENCE machine states "Main Sequence 0" and "Sub Sequence 0". This allows the procedure latched in the PFT register to being processing of the OCL PROCEDURE logic.

The SU/LCS MUX 704 contains the line "no-S-Unit OP". This line is normally active, and must be degated by OCL if OCL requires data transfer to/from the S-Unit. This degating is accomplished by particular ones of the OCL Procedures, for example, FCCW1, FCCW2, FCAW.

When "Request-In" is raised by an I/O device through a controller 411, the CICL 432 will enter a polling sequence (GTS=30). When GTS-32, the I/O device address is stored into Word 0 of LCS. GTS steps to State 33 until address-in drops and status in is raised. The GTS then steps to Status Ready (37).

When OCL detects the GTS of status ready (and OCL is IDLE), the Fetch Subchannel State procedure will be performed. This procedure fetches the I/O address from LCS Word 0 and places it into the I/O Address Register 479.

The signals "-WROO-07 to IOAR", "SEL LCS T WR BTYE 0", "SELECT LCS TO WR", and "ENABLE IOAR CLOCK" are generated by the OCL in order to gate the I/O address into the I/O address register 479.

When the procedure Fetch Subchannel State is completed, the procedure Move ESB and IOAR to Interrupt Buffer (MEBI or MEDI) is performed. This procedure takes the I/O device address from the I/O address register 479 and places it into LCS word 6 byte 3.

The signals "TDH DMOR T DHR CL", "DMOR CLOCK ENABLE", and "SEL DAR TO DMOR BYTE 3" are generated by the OCL in order to gate the I/O Address into the DHR register 439 through selection circuit 487.

I/O OP NOW

When the I-Unit decodes an I/O instruction (SIO, TIO etc.), it raises "I/O OP PENDING" to the C-Unit. It also sends the Channel/Device address from the I-Unit WAR Register on bus 426 to register 479 of FIG. 4.

The Control Mux 704 detects the "I/O OP PENDING" signal, and responsively compares the received channel address with the channel address in SCS F (SCS 15). When the two addresses compare, the Control Mux 704 sends the signal "I/O OP NOW" to OCL.

The OCL latches the "I/O OP NOW" signal as the channel steps to SCS 0.

As the channel steps to SCS 1, the OCL,

1. Sets "Fetch CAW" procedure (for staging register master) if OCL is idle and GTS equal either OP PENDING, Polling Sequence 1, or IDLE.

2. Sets "STIDC" procedure (for staging register master) is the instruction from the I-Unit was 'Store Channel ID' and OCL is idle and GTS equals OP PENDING, Polling Sequence 1 or IDLE.

3. Latches 'I/O OP NOW' in the Staging Register master latches. If the instruction from the I-Unit is one that does not require the CAW, the 'Fetch CAW' procedure is still performed.

When the clocking for the Staging Register slaves occurs, the 'I/O OP NOW' signal is latched in the Staging Register slave latches.

When the Action Register becomes IDLE and is ready to accept a new request, the 'I/O OP NOW' Action Register latch sets.

The OCL monitors the IS field of SCS 0. When a channel requires a CSW to be stored, OCL raises SET RUPT REQUEST. If the interrupt is masked on, the Control Mux 704 sends 'Interrupt Request' (RUPT REQ) to the I-Unit. When the I-Unit is ready to process the interrupt (allow CSW to be stored) 'Interrupt Acknowledge' (RUPT ACK) is sent to the C-Unit.

After detecting 'Interrupt Acknowledge' (RUPT ACK), the Control Mux waits for the requesting channel to cycle into SCS F (SCS 15). When the Channel Address in RCHR equals SCS F the Control Mux sends 'Interrupt Now' (RUPT NOW) to 'OCL'. RUPT NOW is one cycle long and will come up each time the channel number in RCHR equals SCS F until the signal I/O complete (IOCP), from OCL, is received indicating that the CSW has been stored. The Control Mux waits for RUPT ACK to so that the I-Unit and Control Mux becomes IDLE.

As the channel enters SCS 0, OCL Priority Logic latches the RUPT NOW signal. This latch performs the following functions:

1. IF OS=4 (Secondary Interrupt) the RUPT NOW latch sets GTS to OP-Pending (50) via the OCL Immediate Register to prepare for initial selection.

2. IF IFC, CCC, or PCI, Staging Register master procedure for AIC 1 is set.

3. Prevents Staging Register master procedure request for FETCH DEVICE STATUS.

4. Prevents Staging Register master procedure request for DMY 1 from setting.

As the channel enters SCS 1, the OCL Priority RUPT NOW STAGING REG MASTER latch is set. This is the same cycle that the OCL PRIORITY Master latches set.

When the OCL Priority logic allows the procedure request in the Staging Register master latches to be gated to the Staging Register slave latches, the RUPT NOW STAGING REGISTER SLAVE latch is set.

When the Action Register accepts the procedure request from the Staging Register slave latches, the RUPT NOW ACTION REGISTER latch set.

During an Input Chain Data Operation, all incoming data bytes (for the current CCW) are placed into main storage before OCL fetches the next CCW (no CCW prefetching takes place).

During an Output Chain Data Operation, OCL prefetches the next CCW when CICL has 16 or less data bytes left (from the current CCW) to be transferred to the I/O device. After the CCW has been prefeteched, DACL prefetches the data for the prefetched CCW.

If the Data Tansfer to the I/O device abnormally terminates, it is possible that the CICL is operating on the data for either the current or prefetched CCW. In order to place the correct CCW address in the CSW, specific logic is used. One main portion of this logic involves the CPPPP.

The OCL determines when CICL has 16 or fewer data byest remaining by the following formula:

BBC=0 and EX=0 and ADB > 16 = less than 16 left.

When this condition is met, the DACLP from SCS 1 is gated into the OLS field of SCS. This value is then referred to as the CPPPP. Note that the DACLP is the Last Byte Pointer of the current CCW.

If the data transfer to the I/O device abnormally termines, the proper CCW address (for the CSW) is computed by comparing the CICLP to the CPPPP and examining the OCL Distinguisher bit.

If the CICLP minues the CPPPP is greater than 0 (at the termination of data transfer), and the OCL Distinguisher bit is on, then all data for the current CCW has been transferred. No correction of the CCW address is necessary.

If the CICLP minus the CPPP is less than 0, or the OCL Distinguisher bit is off, all data for the current CCW has not been transferred. The procedure BACK UP CD is performed to correct the CCW address.

The OCL procedure logic 719 is conventional sequential which performs a number of different procedures. The logic 719 is defined in terms of a SIOF instruction. The SIOF instruction causes input to the control multiplexer 704 as previously indicated. The multiplexer 704 transmits that input to the priority logic 715 which functions to set the OP NOW latch in the slave latches of the staging register 721. When the staging register 721 has the slave latch OP NOW set, the procedure logic 719 is responsively energized to perform a sequence of procedures. At the time the OP NOW latch is set, the channel number associated with the SIOF instruction is also stored in the action register 720 in the manner previously described.

The first procedure carried out by the procedure logic 719 is Fetch Channel Address Word (FCAW). The FCAW procedure has the function of accessing a fixed location of main store 2 (through storage unit 4) to obtain the channel address word (CAW). In the embodiment of present invention, that CAW is located in storage address 48 of main store. The procedure logic 719 therefore is conventional sequential logic which generates the following sequential signals for fetching the CAW from location 48. Procedure logic 719 gates a fixed address 48 as an input to the SUAR register 464 and causes that address to be latched in register 464. Procedure logic 719 next transfers the contents of register 464 through the circuit 435 without change to the S unit over bus 353. The contents of main storage location 48 are returned to the channel unit over bus 394. Bus 394 has its information latched into the WR register 466. The procedure logic 719 provides a signal to latch the WR register in a conventional manner. The next sequential function of the procedure logic 719 is to output a signal to load the contents of the LCSAR 467. The purpose of loading register 467 is to form an address for the local channel store 406 at which to store the CAW which is located in the WR register 466. Since the store 406 has location dedicated for each of the 16 channels, the high-order field for the address in store 406 is obtained from the channel number. The channel number for the channel which the OCL is currently working on is stored in the action register 720. It was placed there automatically at the time that the OP NOW latch was set in the staging register 721. The channel number is gated from the action register 720 into the high-order field of the LCSAR 467. The procedure logic forces the low-order field to some pre-assigned location for the CAW which is for example location 4. That address is latched into register 467. During the time that the address is being latched into register 467, the sequential logic takes the contents of the WR register 466 as an input to the data manipulator 405. The sequential logic or logic 719 in FIG. 5 controls the gating directly through the data manipulator 405 through the selection control circuit 488.

In FIG. 5, the selection control 488 is merely selection gates which control which one of the inputs of the selection circuit 487 is selected. In the present example, the OCL procedure logic 719 causes selection of the bus 424 so that the data manipulator 405, as far as the present procedure is concerned, does not alter the data. The output from the selection circuit 487 appears on the bus 425 and is latched into the register 437 of FIG. 3. The sequencer 706 after latching the data in register 437 latches it into register 439 which in turn provides it as an input to the local channel store 406. The CAW is placed in local channel store 406 at the address specified by the LCS AR 467. At this point, the procedure designated FCAW is complete.

The procedure logic signals that the FCAW procedure is complete thereby causing a new latch to be set in the PRT register 724 to enable a new procedure which is Fetch Channel Comman Word 1 (FCCW1). When the procedure logic sets the FCCW1 latch in PRT register 724 a sequential procedure FCCW1 commences which is defined as follows. The purpose of the procedure is to fetch the address from the command address word location in LCS 406 and to use it to access CCW1 from main store through the storage unit 4 of FIG. 1. The sequencer 706 first outputs a gating signal to gate the contents of the LCSAR to address the local channel store 406. When thus addressed, the main store address of CCW1 is gated into the LCSFDR 468 via the bus 421. The sequencer 706 generates the latch signal controlling the latching into register 468. Next, the address from register 468 is gated under control of sequencer 706 into the SUAR register 464 and simultaneously into the WR register 466. The contents of the SUAR register 464 are gated without change through the circuit 435 via the bus 353 to the S unit. In the S unit, CCW1 is accessed and appears on bus 394. At the same time that the address was gated over bus 353 to the storage unit, the contents of the WR register 466 was gated into the data manipulator 405. The sequencer 706, in a conventional manner, generates a signal to the functional control 490. Functional control 490 receives the signal which specifies the ingating of the adder 483 of FIG. 4. Adder 483 is controlled to add plus 4 (equal to four bytes) to the address on bus 424 which was derived from the WR register 466.

The incremented address from adder 483 appears on bus 492 and is selected by selection circuit 487, under control of the select control 488. Selection control 488 selects bus 492 to be the output on bus 425. The address on bus 425 is latched into register 437 of FIG. 3 into the register 439. The address is loaded into the LCS 406 at the address specified by address register 467. Concurrently therewith the results from the S unit appear on the bus 394 and are stored, under control of sequencer 706, in the register 466. At this time, the sequencer 706 forces a new low-order field into the LCSAR (for example 8) which together with the high-order channel number field forms a new address location for the local channel store 406. This new channel address location is the location of the real data address which is obtained from the CCW1 currently stored in the WR register 466. Sequencer 706 completes the FCCW1 procedure by gating the contents of register 466 through the data manipulator 405 into the register 437 and 439 to the location in 406 specified by the address in register 467.

At this time, the sequencer 706 re-enters the old low-order field for the address register 467 (for example, 4) to specify the address in store 406 of the command word address in main store. That command word address has already been incremented by 4 as previously described and so it is now the address of channel command word 2, CCW2.

This operation completes the procedure FCCW1 which causes a new procedure to be latched into the register 724. The new procedure is for fetching channel command word 2 and is designated FCCW2.

The FCCW2 procedure is essentially the same as the FCCW1. The main store address of CCW2 is accessed from local channel store 406 and is placed in register 468 and in turn is latched in register 464. From register 464 it is gated to the storage unit and the storage unit returns the address to the WR register 466. At this time the sequencer 706 increments the low-order field of the LCSAR register 467 so as to store the contents in register 466 in the local channel store 406 at a still new address location. The contents of WR register 466 (containing CCW2) are gated over bus 424 into the manipulator 405. In the manipulator 405, the CCW2 appears on the bus 424. The functional control 490 causes CCW2 to be gated through adder 483 without modification so as to appear on bus 492. At this time, the 11-bit field on bus 492 is input to the EX CAL circuit 471 and to the BBCR circuit 470 to produce a byte count field on bus 458. Bus 458 connects to the result logic for posting the initial count into the SCS at the appropriate time.

The data manipulator of FIG. 4 includes the command register 446 which receives and stores the command from a channel command word, a flag register 477 which receives and stores the flags from a channel command word and the status register 476 which receives and stores the status from a channel command word. These values, under control of the procedure logic 719 are made available to the result logic for entry into the appropriate SCS fields when the result logic 725 is enabled for posting. When the FCCW2 procedure is completed by the sequencer 706, the necessary information has been made available to the result logic for loading the SCS. The final procedure of the procedure logic 719 is called the "Save Mode Procedure" in which certain information is placed in a location of the local channel store 406. For purposes of the present invention, the save mode can be ignored. When the save mode has been completed, it signals the completion of the procedure string for the OCL 429. After the save mode procedure signals completion, the result logic 725 post the information fields, previously discussed, into SCS 2 to signal that it is now time for the DACL processor 430 and the CICL processor 432 to begin transferring data and rendering the OCL idle. When idle, the OCL can commence a procedure for another channel.

The above procedures were discussed assuming that only one channel had priority and OCL 429 was fully dedicated to processing one channel. The FCAW procedure string actually has a priority of 2. Other procedures of priority 1 may have forced the FCAW procedure to wait before being processed by the OCL.

DATA ACCESS CONTROL LOGIC - FIG. 6

In FIG. 6, the data access logic (DACL) which forms one part of the channel control logic of FIG. 5 is shown in further detail. The DACL moves data to/from the Local Channel Store (LCS) 406. On write operations the DACL moves data from the S-Unit 4 of FIG. 1 to the LCS 406 and on read operations the DACL moves data from the LCS 406 to the S-Unit.

The DACL is a pipeline processor which uses the Shifting Channel State (SCS). Each cycle a new channel's state information resides in SCS2, and DACL processing requirements are determined from this information. If the DACL does processing, at completion, new state information is posted back into SCS 2 by the DACL result logic 740.

The pipeline works in 3 stages — staging, action, and result. The priority logic 734 determines, each cycle, whether the channel in SCS2 should be staged. If the staging register (SR) 735 is empty and the channel requires DACL processing, the staging register 735 will be clocked. This clocking puts part of the SCS2 information, plus some new information, into the SR.

When the action logic 739 is available, the staging register 735 will be transferred to the action register (AR) 736. The AR register 736 provides the action logic with information needed to move data to/from the S-Unit. On a read operation, the Controller Interface Control Logic (CICL) 432 is putting data from an I/O device into the Local Channel Store (LCS) 406, and the DACL action logic 739 is transferring this data on to the S-Unit. On a write operation, the inverse is true, the DACL puts S-Unit data in LCS, while the CICL removes the data and sends it to an I/O device. At the completion of a data input or output operation, the DACL action logic 739 creates new states for the channel acted upon. The state information is then passed on to the result logic for posting into the Shifting Channel State (SCS).

There are two result registers in the result logic. Result Register 1 (RR1) 737 receives data from the action logic. Result Register 2 (RR2) 741 receives data from RR1 and passes it on to SCS2 to be posted. In this manner, the result registers act as a pipeline to buffer results of up to two different operations.

In summary, the complete DACL pipeline can have four channels at various points of processing. One channel can be staged in the Staging Register (SR) 735 and waiting for action. Another channel can reside in the Action Register (AR) 736 while the DACL action logic is working on this channel. Two channels may have results in result register 737 and result register 741 waiting to be posted back into SCS2. The second stage, SCS2, of the shifting channel state memory cyclically receives information from the SCS1 stage on bus 742. For each cycle, information concerning a new channel is available to the DACL. SCS2 cyclically outputs information to the SCS3 stage on bus 743 and to the CICL on the buss 744.

The information in the stage SCS2 for each cycle is input to the DACL priority logic 734 via bus 746 to determine if the channel in stage SCS2 has the highest priority for an action by the DACL of FIG. 6. If it does, the actual transfer length (TL) to be undertaken is output on a 2-bit bus to the staging register 735. The priority determination in logic 734 can be, for example, merely an indication of whether or not the DACL is currently busy and, if not, granting priority to whatever channel is currently in SCS2 by loading information into staging register 735 with a clock signal. Other more intricate priority relationships, of course, can be employed.

The actual transfer length (TL) of a transfer to be made by the DACL is typically four bytes and is determined by a 2-bit TL code from the logic 734 which is loaded into staging register 735. Other lengths are employed for example if at the end of a transfer less than four bytes remain to complete the transfer. In that case, the actual transfer length code TL represents 3,2, or 1 byte as is appropriate. The logic 734 also accounts for other special conditions, such as transfers approaching a page boundary, and produces control signals on the 3-bit line DTP and the 2-bit line TP. These controls are not necessary for use in connection with the present invention and are not discussed further.

The staging register 735 accepts information from logic 734 and directly from stage SCS2 on 23-bit bus 746. That information includes the 1-bit old EX, the 5-bit old BBC, the channel number, and other control information not pertinent to the present invention. Of particular interest in the present invention is the old BBC field which stands for buffered byte count(BBC) and the 1-bit EX field which stands for extended BBC BIT (EX). The BBC field is the low-order five bits of the remaining count field. The EX bit signifies whether any of the 11 high-order bits are present in the remaining count field. The staging register 735 holds among other things the BBC, that is, low-order five bits of the desired count field, the EX indication of whether any high-order eleven bits exist in the 16-bit count field, and the TL indication of the actual transfer length to be undertaken in the present operation of the DACL. The information in staging register 735 defines the next transfer to be performed by the DACL. The contents of the action register 736 represents the transfer currently being performed by the DACL. When the current transfer is completed, the information about the next transfer in register 735 is loaded into register 736.

The contents of the action register 736 are input to the DACL action logic 739. The action logic 739 is combinatorial logic which steps through a fixed sequence as a function of the input from action register 736. The action logic uses the action state register 739-2 for storing the sequencing states of the DACL action logic. The sequencing of the action logic 739 controls many timing signals which are output on control bus 748. The timing signals on bus 748 are conventional latching and transferring data and their specific sequences are defined hereinafter in connection with the operation of the present invention.

The action logic 739 includes a conventional comparator for comparing TL, the actual transfer length desired, with the old BBC. If TL is less than or equal to BBC, the actual transfer can occur with a short sequence and hence the action logic 739 and state sequence register 739-2 causes a short sequence to be carried out as hereinafter explained. If TL is greater than BBC, then the old EX field is examined. If EX is set (meaning high-order bits exist) at a time when TL is greater than the old BBC, then the action logic 739 and state sequence register 739-2 specifies a long sequence. The long sequence fetches the high-order bits from the channel memory and thereafter replaces the remaining count field into channel memory. If BBC is less than or equal to the maximum transfer length TL (in this case 4) and EX is not set, then the short sequence is followed. When the old BBC is reduced to all 0's, and the EX is not set, the original transfer is complete and the count exhausted.

In general, the outputs from the action logic 739 cause the transfer of bytes of information between the channel memory and the storage unit. In addition to making that actual transfer of bytes of information, the action logic 739 causes the remaining count field to be decremented by the amount of the actual transfer. In accordance with one embodiment of the present invention, the decrementing of the count field is achieved by initially decrementing the BBC circulating in the state memory and the count field in local channel store if necessary. When a borrow from the high-order bits is necessary, a long sequence is employed to access the high-order bits from the local channel store 406, to decrement the total remaining count field, and to store the new remaining count field back into the store 406.

The old BBC and the old EX, prior to the actual transfer, appear in the action register 736. The old BBC is output on the 5-bit bus 460 to the data manipulator circuitry of FIG. 4. Similarly, the old EX from register 736 is output on 1-bit line 457 to the data manipulator of FIG. 4. After processing by the data manipulator, the new EX on 1-bit line 418 is received from the data manipulator and is stored in the result 1 register (R1R) 737. Similarly, the new BBC is received on 5-bit bus 427 and is stored in the R1R register 737. The channel number is input to the result register 737 from a register 749 which stores the value of the last channel having control of the DACL. The channel number in register 749 is derived from the action register 736. When the channel number, the new BBC, and the new EX are input to the register 737, they are available for loading to the result 2 register (R2R) 741. The channel numbers in both the result registers 737 and 741 are available as inputs to the priority logic 734. In this manner, the channels having control of the DACL may be used to decide that the channels presently being serviced by the DACL have no priority to use the DACL. With the new BBC and the new EX values in the register 741, they are available for posting back into the state memory through the DACL result logic 740.

Logic 740 includes a conventional comparator which receives the channel number from SCS1 on bus 750 from bus 742 and compares it with the channel number in R2R register 741. When a compare occurs, the new EX and new BBC values in register 741 are gated through the result logic 740 to the bus 745 where they are inserted into the SCS2 stage along with information from SCS1. The old BBC and old EX in SCS1 are discarded. The amount of time required to make the transfer to the storage unit and new values of EX and BBC can be inserted into the SCS2 stage is a function of whether or not only the low-order field (BBC) need be updated with a short sequence or whether a borrow is required and the entire count field must be updated with a long sequence.

CHANNEL UNIT OPERATION

Operation of the channel unit in accordance with the present invention is described in accordance with a typical instruction "START I/O FAST RELEASE" (SIOF). As initial conditions, all channels, 16 in accordance with the present example, are idle and must be initiated through the initial program load (IPL) or alternatively by a reset command. With the initial program loading carried out, instructions are loaded into the main store and instructions are fetched and processed by the I-unit. As part of the initial program loading, any I/O instruction such as SIOF sets up in storage a sequence of channel commands which effectively are a channel program. Also the initial loading places a pointed in a fixed location of memory, for example location 72 in the present system, which identifies the location of the first command in the channel command sequence. When the start I/O command is fetched by the I-unit, the effective address register in the I-unit is loaded with information which is communicated to the channel unit via bus 426. The channel unit recognizes the start I/O instruction in the state logic and waits for the addressed channel information, which is circulating through the stages SCS0 through SCS15, to arrive at the SCS1 location causing notification of the immediate procedure logic when the appropriate one of 16 channels arrives at the SCS1 location. Assuming, for purposes of this example, that the state of the addressed channel is idle, the OCL allows the contents of SCS1 to be entered into the staging register 721 while the result logic 725 changes the state of the channel (assume channel 5 as a typical example) indicating by latching into SCS2 the operation pending condition. During each cycle, the channel information is stepped one stage at a time through the stages 710 so that after 16 cycles, each channel's information has stepped through all of the stages SCS1 through SCS15.

For a start I/O instruction, the channel information continues to step through the stages 710 where the OCL circuitry 429 becomes dedicated to a specific channel, channel 5 in the present example. While circuitry 429 is dedicated to channel 5 for processing, the other parts of the channel control logic (STATE DACL, CICL) can be employed in the processing of channels other than channel 5.

For a SIOF instruction, the I-unit is waiting for the channel unit and particularly the OCL to finish processing its part of the channel function. Specifically, for a SIOF instruction the OCL is responsible for fetching a channel address word into the channel buffer store while checking to insure that the subchannel state store is available for procesing the identified addressed device. Assuming that the subchannel identified is device 25, (thereby implicitly identifying a subchannel), the procedure logic 719 after accessing the channel address word, and thereby locating the address of the first channel command word, stores command pointers into the channel buffer store of the LCS and performs validity checks on the information. In carrying out its functions, the OCL uses common data paths and memory to control the functions.

With the accessing of the first channel command word, the procedure logic 719 signifies to the control multiplexor 704 that the SIOF instruction of the I-unit of the data processor has been completed as signified on the return lines 716, thereby allowing the I-unit to continue processing further instructions in its instruction stream.

With the first channel command word fetched the procedure logic 719 notifies the result logic 725 that the initial selection state for the associated channel 5 should be entered into the data transferred from SCS1 to SCS2 whenever the channel 5 information next is loaded into SCS1 during its normal shifting cycles. When the CICL circuitry 432 in logic 757 detects the initial selection state of any channel, it causes a channel buffer store (CBS) access in order to obtain a device address and a command and to route it to the correct physical interface and the correct I/O controller using the remote interface logic 407 of FIG. 3.

Assuming the first command is to transfer information from the control unit to the main store, the CICL manipulates the control lines and the LCS causing data to be transferred from the I/O controllers to the LCS. The CICL through control logic 757 and output bus 780 to the appropriate channel stage SCS4 or SCS12, maintains a record of what locations of LCS contain the transferred data. When a sufficient amount of data is gathered into the LCS, the DACL recognizes the necessity of a transfer to main store by observing the state of channel 5 as it appears in the SCS2. At this point, the DACL will cause a transfer of data from the LCS to main store.

When the channel command word was obtained from the I-unit of FIG. 1, it is transmitted under control of the OCL over bus 394 to the working register (WR) 466 in FIG. 3. From there it is transmitted through the data manipulator 405 to the bus 425 without alternation and is latched into the DMOR register 437. From there it is latched in the DHR register 439 and stored in the local channel store 406. In that way, the 16-bit count field initially becomes stored in the channel store 406.

When the count field from the channel command word is gated from the WR register 466, it passes through the adder 483 in the data manipulator of FIG. 4 and appears unaltered on bus 492. On the bus 492, the five low-order bits are extracted and loaded into the BBCR register 470. From there, the initial value of the new BBC is gated to the OCLRR register 467 in FIG. 5.

At the same time in the manipulator of FIG. 4, the eleven high-order bits of the total transfer length field are input to the EX calculator 471 where the high-order bits are OR'ed to form the initial new EX signal on line 418 which is stored also in BBCR register 470 and transferred to OCLRR register 467. From register 467, the initial new EX and BBC values are gated by logic 725 into SCS2 when SCS1 contains the appropriate channel number.

As a typical example, a total count of thirty-six bytes is assumed. In the 16-bit count field, the eleven high-order bits include ten high-order 0's followed by a 1 and the low-order five bits are 00100. The count appears in binary notation as 100100 preceded by ten high-order 0's.

When the channel command word was obtained from the I-Unit of FIG. 1, it is transmitted under control of the OCL over bus 394 to the working register (WR) 466 in FIG. 3. From there it is transmitted through the data manipulator 405 to the bus 425 without alteration and is latched into the DMOR register 437. From there it is latched in the DHR register 439 and stored in the local channel store 406. In that way, the 16-bit count field initially becomes stored in the channel store 406.

When the count field from the channel command word is gated from the WR register 466, it passes through the adder 483 in the data manipulator of FIG. 4 and appears unaltered on bus 492. On the bus 492, the five low-order bits are extracted and loaded into the BBCR register 470. From there, the initial value of the new BBC is gated to the OCLRR register 469 in FIG. 5.

At the same time in the manipulator of FIG. 4, the eleven high-order bits of the total transfer length field are input to the EX calculator 471 where the high-order bits are OR'ed to form the initial new EX signal on line 418 which is stored also in BBCR register 470 and transferred to OCLRR register 460. From register 469, the initial new EX and BBC values are gated by logic 725 into SCS2 when SCS1 contains the appropriate channel number. The DACL POINTER field in the SCS is initialized to zero by the OCL.

As a typical example, a total count of thirty-six bytes is assumed. In the 16-bit count field, the eleven high-order bits include ten high-order 0's followed by a 1 and the low-order five bits are 00100. The count appears in binary notation as 100100 by ten high-order 0's.

With the above typical example, the initial new BBC stored in SCS2 by the OCL is 00100. The value stored in SCS2 for the initial new EX bit is 1, since the high-order eleven bits are non-zero.

With the initial new BBC and the initial new EX stored in SCS2, the DAC1 is ready to commence a transfer of 36 bytes of data whenever channel number 5 obtains priority, for use of the DACL. When channel 5 does obtain priority, the BBC and the EX for channel 5 in SCS2 are gated through to the action register 736. In register 736 the BBC and the EX are now treated as the old BBC and the old EX and are examined in action logic 739. Assuming that the usual case actual transfer length TL is four bytes, the value 100 of TL is compared with the BBC in register 736 by logic 739. Since BBC having a value of 00100 is equal to or greater than the value of TL which is 100 action logic 739 calls for a short sequence. The short sequence is identified in the following CHART I.

| | CHART I - Short Sequence | | |
|---|---|---|---|
| Cycles | CHANNEL TO S-UNIT | Cycles | S-UNIT TO CHANNEL |
| 1 & 2 | Fetch Data Address | 1 & 2 | Fetch Data Address |
| 3 & 4 | Fetch Data | 3 & 4 | "Not Used" |
| 5 & 6 | Store Data Address | 5 & 6 | Store Data Address |
| 7 & 8 | "Not Used" | 7 & 8 | Store Data |

In making the short sequence transfer of data from the channel store to the storage unit, the data address in the channel store must be first accessed from the channel store and placed in the storage unit address register 464 of FIG. 3 in cycle 3. Each access of the channel store requires two cycles. Next, the data itself must be fetched from the channel store using the address in register 467 in cycle 3. The address is set up by adding the channel number from addtess register 739 to the DACLP field in register 736. If the address was 100 and TL was 4, the address becomes 104. The accessed data is output on bus 421 and stored in the register 468 from where it is transferred to register 465 and out to the storage unit through bus 358. Finally the modified data address which identifies the next byte to be transferred is stored back into the local channel store 406. The address 104 (100 + TL(4) = 104) was added by data manipulator 405. In cycle 3, the old data a-dress in WR 466 is added to TL in CHDM 405 and loaded in DMOR 437 and to DHR 439 in cycle 5 and then to LCS 406. A similar sequence is employed for a transfer of information from the storage unit to the local channel store 406.

During the above short sequence identified in CHART I, a transfer of four bytes occurs between the storage unit and the channel unit. Accordingly, the TL value 100 must be subtracted from the initial total count field to form the remaining count field. The TL value 100 is substrated from the BBC value 00100 in the data manipulator and forms a result of 00000 which is the new BBC.

Note that since the initial BBC was 100, the 100 subtraction of TL was made without needing a borrow from the high-order field. Therefore the old EX bit remains valid and is selected to be the new EX bit. Hence new EX=1.

After subtraction of 100 from the BBC, the new BBC is 00000. That new BBC is, of course, stored in the R1R register 737 and subsequently R2R 741 of FIG. 6 and is transferred to the SCS2 thus momentarily completing the use of the DACL by channel 5.

When the channel number in SCS1 matches the channel number in RR2 741, the DACL loads the new BBC, new DACL pointer (now=4), and the new ADB in SCS2. ADB and DACLP are adjusted (decremented and incremented, respectively) using the TL in RR2 741.

With the new EX and the new BBC stored in the SCS2 stage, the state memory continues to circulate until channel 5 again reappears in SCS2 and obtains priority for use of the DACL. Since the total transfer of 36 bytes has not occurred, channel 5 will again at some time be given priority by the priority logic 734 in FIG. 6. When channel 5 gains priority, the channel 5 number, a new TL value of four bytes, the now old BBC (00000) and the old EX(1) are gated into the staging register 735. If the ACTION LOGIC is IDLE the SR register 735 will be gated into the action register 736. The old BBC (00000) and the EX bit (1) are gated to the data manipulator on buses 460 and 457, respectively.

In the present instance, the TL value equal to 100 cannot be subtracted from the old BBC equal to 00000 without a borrow from the high-order bits which are know to exist because EX is 1. Accordingly, a long sequence must be followed in order to properly subtract the actual transfer length (100) from the remaining count (100000) arrived at, as always, by concatinating the high-order eleven bits of the count word is LCS with the BBC field on SCS. The long sequence is summarized in the following CHART II.

| CHART II - Long Sequence | | | |
|---|---|---|---|
| Cycles | CHANNEL TO S-UNIT | Cycles | S-UNIT TO CHANNEL |
| 1&2 | Fetch Data Address | 1&2 | Fetch Data Address |
| 3&4 | Fetch Data | 3&4 | Fetch Count |
| 5&6 | Fetch Count | 5&6 | Store Modified Data Address |
| 7&8 | Store Modified Data Address | 7&8 | Store Modified Count |
| &10 | Store Modified Count | 9&10 | Store Data |

As in a short sequence, the address is fetched from local channel store. It is now 104. The modified address will be 104 + TL(4) = 108 and stored back into LCS.

In the long sequence in the above CHART II, the two additional steps of Fetch Count and Store Modified Count are added. During the Fetch Count step, the total count field, including the eleven high-order bits, are fetched from the local channel store and are gated to the register 468 from where it is transferred to the working register 466 in cycle 7. In the data manipulator of FIG. 4, the high-order eleven bits from register 466 (1 proceded by ten 0's) are concatinated with the low-order bits (which is the old BBC of 00000 on bus 460) and are input to the right-hand port of the adder 483. Concurrently, the TL value of 100 is input to the left-hand port of adder 483 and the left input is subtracted to form the result on bus 492. When 100 is subtracted from 100000, the result on bus 492 is 011100.

The new BBC is 11100 and the new EX is 0. Since in the particular example chosen, all eleven high-order bits are 0 so that the new EX bit is now set to 0. The new count high-order eleven bits are loaded into DMOR 437 and into DHR 437 in cycle 9 and loaded into LCS. The new EX equal to 0 and the new BBC equal to 11100 are stored in the result registers 737 and 741.

When channel 5 again appears in SCS1, a comparison is made in the result logic 740 and the new EX and the new BBC are stored in SCS2. The information in SCS2 continues to circulate in the state memory until the priority logic 734 again determines that channel 5 has priority. At this point, the channel 5 number, the now old BBC(11100) and the old EX(0) are input to the action register 736. The action logic 739 determines that the old BBC(11100) is greater than the actual transfer length 100 so that a short sequence is called for.

The short sequence is repeated as given in CHART I above. Four bytes of data are transferred from the channel memory to the storage unit while the high-speed data manipulator subtracts 100 from the old BBC 11100 to form the new BBC equal to 11000. From this point on the 0 value for the EX bit does not change since no borrows are needed from the old BBC.

The operation continues with a short sequence until the new BBC has been reduced to 00000. Since EX is also $\phi$, at this time, both the DACL and OCL can determine that the data transfer is complete. The CICL ends data transfer and then turns control to the OCL after it has received STATUS (from the Control Unit). After status handling, the OCL turns control over to the CICL and completes the sequence to idle the channel.

When all data has been transferred, the OCL notes this fact and causes the result logic 725 to operate on the channel state such that channel 5 becomes idle. Thereafter, channel 5 is available again for transferring information from the I/O controllers to the storage unit.

While the above example has been given in connection with a single channel, that is channel 5, it is apparent that while the different parts of the channel control logic are operating on the channel 5 transfer, they can be concurrently operating on other channels. For example, while the state logic 428 is busy with channel 5, the OCL logic 429 can be operating on the control information associated with some other channel while simultaneously the DACL logic 430 may be processing still a third channel while the CICL is processing still a fourth channel. As each part of the channel control logic 403 becomes available it accepts an input from the shifting channel state (SCS) and begins processing an appropriate channel.

CONTROLLER INTERFACE CONTROL LOGIC (CICL)

The CICL 432 is a pipelined processor which moves data between the Local Channel Store (LCS) and the I/O devices.

During a Start I/O instruction, the Operations Control Logic activates the CICL by changing the Global Transfer State (GTS) field of the Shifting Channel State (SCS). The CICL responds by initiating the Initial Selection Sequence, a work sequence, then an ending sequence. Meanwhile, the OCL monitors the operation by examining changes that the CICL makes to the Shifting Channel State.

The OCL will intervene as Channel End and Device End status are received from the device. As Channel End status is received, the CICL sets a new GTS state in the Shifting Channel State. This prevents further action in the CICL until the OCL handles the status and releases the CICL, by changing the GTS to a new value. The CICL recognizes the new GTS state and continues processing. The handling of Device End status is similar.

Also, the OCL monitors CICL operations for errors. If the CICL detects an Interface Control Check or Channel Control Check, the CICL will set an error value into the Unusual Termination Field of the SCS. The OCL will sense this error field in SCS and cause the storing of a Channel Status Word (CSW).

These eleven interface sequences performable by the CICL 432 are defined in: IBM SYSTEM/360 and SYSTEM/370 I/O INTERFACE CHANNEL to CONTROL UNIT ORIGINAL EQUIPMENT MANUFACTURER'S INFORMATION. (Form number GA22-6974).

To execute the CICL sequences, the CICL uses the Local Channel Store (LCS), the Remote Interface Logic (RIL) and the Shifting Channel State (SCS).

The LCS contains a data buffer with 32 data locations for each channel. This data will be sent to the I/O interface on output. On input, the data buffer is used as intermediate storage for data received from the I/O interface. The Local Channel Store (LCS), also, contains the device commands sent to the I/O control unit under control of the CICL. And, status received from the I/O device is stored in the LCS by the CICL.

The Remote Interface Logic provides the data paths to and from the Local Channel Store (LCS) for the 16 channel interfaces — the CICL provides the control but has no data paths. The I/O interface connectors attach to the RIL frame. On input, data (or tags) moving from these interfaces are buffered in the RIL then passed on to the LCS under control of the CICL. On output, the flow is reversed.

To control the flow of data between the LCS and RIL, the CICL uses information from the SCS and the RIL. This information is loaded into an input staging register; CICL processing is done from this register.

CICL processing takes only 1 cycle; however, only one step is executed in the flow. Since it akes many steps to execute any one of the 11 sequences, CICL operations take many machine cycles.

The CICL and the Remote Interface Logic (RIL) work together as a pipelined processor.

The pipeline is started when the CICL sends a sync pulse to the RIL sequencer. The sequencer begins emitting Strobe (S), Edge (E), Control (C), and Bus (B) pulses; the pulses gate information from the I/O interface into the RIL.

During the first four cycles of the CICL-RIL pipe, in-tags are sampled and latched into the RIL. The in-tags are collected simultaneously from a Hi/Lo channel pair with channel numbers eight apart; e.g., 0-8, 1-9, etc.

While in-tags are collected, if service-in or data-in is present, a leading edge latch will be set in the RIL. The leading edges in RIL are sent to the CICL and tell the CICL when data is required by an I/O device.

The priority logic in the CICL examines the leading edges. If neither or both channels of the Hi/Lo pair has a leading edge, the CICL will give priority to the channel which has not received service for the longest period of time.

Output of the priority logic is a signal used to select either the high numbered channel or the lower numbered channel. This selection signal is sent to the Hi/Lo select shift register.

The Hi/Lo select shift register contains 8 stages, and remembers only whether the highest numbered channel or the lower numbered channel was selected by the priority circuits. Each cycle the remembered signal is shifted to the next stage of the shift register. As a selected channel moves through the pipeline, the Hi/Lo select shift generates gates for controlling the CICL and RIL.

The first control from the Hi/Lo select shift register ingates the Shifting Channel State (SCS) information into the CICL input staging register (CICLIS). (Each of the channel's state information resides in the SCS, and of the two channels illegible for service, one is in SCS2, the other in SCS A)

At the same time, state information is loaded into CICLIS, the Hi/Lo select shift register also gates the selected channels in-tags and out-tag feedback information (from the RIL) into CICLIS for processing.

Processing in the CICL takes only 1 cycle (P-cycle). The processing logic determines: 1) new state information, to depict which step the channel is doing for the current operation, 2) the new out-tags, to be transferred to the Remote Interface Logic (RIL); and 3) requirements for local channel store (LCS) writes or fetches.

During processing new channel state information is generated. The information is posted into SCS on the cycle following the P-cycle, and is done by a remembering device set from the priority circuits.

Also, during processing it is was determined an LCS store of fetch is required, an address is generated and loaded into the Local Channel Store Address Register (LSCAR). A store operation ccould be to store status of data; a fetch operation could be to fetch an I/O address, command, or data.

Status or data-in come into the RIL from the I/O interface bus-in lines. This data (status/data) is gated through the I/O bus buffers until control of the Hi/Lo select shift register and the RIL sequencer. As the data passes through the RIL, it is latched in the Interface Logic Get Data Register (ILGDR). A byte selector is used to rearrange, if necessary, the bytes of data in the ILGDR before sending them to the Local Channel Store (LCS).

Data or Commands coming from the LCS are put into the 32 bit Interface Logic Put Data Register (ILPDR). A byte selector, on the output of the ILPDR, sends 1 byte to the RIL. For a two-byte wide interface, 2 bytes would be selected and sent to the RIL. The Hi/Lo select shift register and the RIL sequencer provide the gating controls necessary to move this data through the output buffers (A & B) and out to the I/O interface bus-out lines.

Start to Remote Interface Sequencer

Each time the channel number in SCS2 is equal to 3 or E, the RIL sequencer will receive a start pulse. The sequencer will run eight cycles then receive a new start pulse. Through this process the RIL sequencer runs continuously.

*ADB Generation & Control

When a channel is in the P-cycle an ADB operand is generated; the operand may be true or compliment. True ADB operands are for normal operation. Compliment operands are for correction operations. The generated operand is added to the ADB in CICLIS for new ADB generation. If CICL does not transfer data to an I/O device, the newly calculated ADB is discarded and the ADB in SCS remains unchanged.

*Available DACL Buffer (ADB)

On output ADB is the number byte locations which are empty in the Channel Buffer Store (CBS).

On input ADB is the number of bytes currently in the CBS.

Each time a channel enters the process (P) cycle a decision is made to:

fetch data from the CBA data buffer and transfer it to the RIL output buffers or, store data from the I/O device (in ILGDR) into the CBS or, do neither a CBS store nor a CBS fetch.

If either a store or fetch occurs, the Available DACL buffer (ADB) must be updated and posted into the Shifting Channel State (SCS).

For updating the ADB, the CICL computes a 5 bit field called the ADB operand. The bits are numbered 0 to 4. On an output operation, the operand equals the number of bytes transferred from the Channel Buffer Store (CBS) to the RIL output buffers. On input, the ADB operand is equal to the amount of bytes received from the I/O device and sent to the CBS data area.

The ADB operand can be in true or compliment form. True operands are for normal input or output operations. Compliment operands are used for correction operations.

On output, ADB correction is needed when an I/O device drops op-in or raises status-in before the channel CCW count is 0. In this case, a negative operand is generated. This will be explained in more detail later. The ADB operand is added to the old ADB in CICLIS to create a new ADB.

CICLIS receives an ADB from SCS 2 or A each cycle via the HI/LO select shift register. This ADB is added to the ADB operand generated by the CICL and posted back to SCS 4 or C. However, during CICL processing if no data transfer is required, the newly computed ADB will not be used, instead a selection circuit selects the ADB from SCS 3 or SCSB.

The selection is based on whether the channel CICL is processing came from SCS 2 or SCS A (SCS 10) which was determined by the HI/LO select shift register during the Bus (B) cycle. If the CICL processed the channel in SCS 2, then the ADB from SCS 3 is gated into SCS 4. If the CICL had processed the channel in SCS A, then the ADB from SCS B would be gated into SCS C.

+ ADB Operand Generation

This operand is an increment amount to the ADB adder and will equal +1 byte (00001) or +2 bytes (00010) under normal operation. A plus one operand is generated, on input or output, if a one byte interface is being used and a byte of data is to be transferred between the data buffer and the RIL. A plus two operand is generated, on input or output, only if a two byte interface is being used. CICL can also generate a plus one for a two byte interface, as in the case of an odd byte count, when the last byte is transferred from the CBS to the RIL.

Example of ADB Generation

During the Process cycle (when the channel's information is in CICLIS) the ADB is inspected. It is determined whether the operation is input or output; also, how wide the data transfer is. From this the new ADB value is determined.

If ADB from SCS was equal to 00111, and the operation is for a one byte transfer, the ADB will be set to 010000. This is accomplished by:

1. Point A = plus due to an output operation
2. Point B = plus due to point A being minus and point C being minus (not a two byte transfer
3. Point D will be plus due to point B being plus
4. Point E will be minus due to point D being plus
5. Point H will be plus because the ADB bit 4 from SCS was on (point G)
6. Point H being plus causes point I to be minus, turning off bit 4 of the new ADB.

If ADB was equal to 00110, the new ADB will be equal to 00101. This is accomplished by:

The same as 1-4 above, the point H will be minus due to point G being plus. This causes point I to become plus.

(−) ADB Operand Generation

The CICL may need to subtract from the ADB. This is accomplished through the generation of a compliment ADB operand. The compliment operand is then added to the ADB in the CICL Input Staging Register (CICLIS). This subtraction, through compliment addition, is referred to as ADB correction.

ADB correction takes place when an I/O device drops op-in or status-in before the channel CCW count has reached 0. In either case there may be data in the RIL output buffer which has not been transferred to the I/O device. Since the ADB has been modified (reflects a false count), an ADB correction is necessary, as the ADB is used in CSW generation.

The ADB operand generated for correction may be −1 byte (11111), −2 bytes (11110), or −3 bytes (11101). However, the 2 and −3 operands are only generated when a two byte interface is in use. Additionally, compliment operands are only generated on output generations.

NEW ADB GENERATION

The new ADB generation takes place in a dual 5 bit adder contained on one chip —CL29. The adder has no controls and does a simple binary addition of the 5 bits from the ADB operand and the 5 bits of ADB from CICLIS.

ADB Ingating to SCS

A channel's new ADB is computed during the Channel's Process (P) cycle. And, during the following cycle (CTS/DIS), the new ADB is returned to the SCS.

A selector is used to control the gating of the ADB to SCS. As explained previously, the new ADB can go to SCS 4 or C. In the case of no CICL data transfer, the ADB from SCS 3 or B is selected instead of the new ADB from CICL.

CHANNEL LOCAL STORE (LCS) ADDRESSING

The LCS address register (LSCAR) can be ingated by the Operations Control Logic (OCL), the Data Access Control Logic (DACL), the console and the Channel Interface Controller Logic (CICL). The OCL and DACL via for LCS every odd machine cycle; CICL accesses LCS every machine cycle.

Control Accessing

Making an LCS request to store an I/O address, store status, fetch an I/O address, or fetch an I/O command is called control accessing. Control accessing is done while the Global Transfer State (GTS) is equal to anything but the work states (66-77).

LCSAR BIT GENERATION FOR CONTROL ACCESSING

LCSAR BIT 10 is forced off anytime CICL has access to the LCS. LSCAR BUT 1-4 is the channel number and comes from the CICL Input Staging (CICLIS) register. LCSAR BIT 5 is forced off because GTS is not equal to work, during control accessing. LCSAR BIT 6 is set on if GTS is equal to 61 (fetch command).

LCSAR BIT 7 is set off if:

1. GTS - 01 (CICL is fetching an address for HALT I/O) or

2. GTS=32 (CICL is storing an address for a device which has presented request-in) or 3. GTS=52 (CICL is fetching an I/O address for initial selection) or 4. GTS=60 (CICL is fetching an I/O address to compare with the address sent in form an I/O device) or 5. GTS=61 (CICL is fetching a command to send an I/O device).

Bit 7 is set on if GTS=26, 34, 44, or 64 (CICL is storing I/O device status). LCSAR BIT 8 is set off for all control accesses because GTS is not equal to WORK.

LCSAR BIT 9 is set on if the operation is a write to LCS.

LCSAR BIT 10 is set on via the BYTE O WRITE MARK circuits, during all control accesses because GTS is not equal to WORK.

LCSAR BIT 11 is set on if GTS is equal to 01, 32, 52, or 60. (see LCSAR BIT 7 for description of states). Bit 11 is set via the BYTE WRITE MARK circuits.

LCSAR BIT 12-13 are set off during control accesses via the BYTE 2 WRITE MARK and BYTE 3 WRITE MARK circuits. They are set off because GTS is not equal to WORK.

Data Accessing

The CICL will be in a data transfer when the Global Transfer State (GTS) is equal to WORK (states 66–77). The transfer may be input, moving I/O data to the Local Channel Store (LCS); or output, moving data from the LCS to an I/O device. During data transfer, the CICL is doing data accessing to LCS as opposed to control accessing. Remember during control accessing the GTS is other than WORK.

LCSAR Bit Generation for Data Accessing

LCSAR BIT 0 is set off anytime CICL has access to LCS.

LCSAR BIT 1-4 is the channel number and comes from the CICL Input Staging (CICLIS) register.

LCSAR BIT 5 is set on because GTS is=WORK (66–77).

LCSAR BIT 6-8 come from the CICL pointer. The CICL pointer is generated on CL 29 by adding the Available DACL Buffer (ADB) to the DACL pointer.

LSCAR Bit 9 is set on if the operation is a write to LCS.

LCSAR BIT 10-13 are set on by the BYTE (0-3) WRITE MARK circuits.

LCSAR PRIORITY

Odd Number Channel Request - is made during even cycles; CBS available is turned off; the generated address is latched and held 1-cycle; LCSAR is ingated during the odd channels CBSI cucle.

All odd channels enter the CICL process cycle during an even machine cycle. The low-order bit of the channel number generator determines odd-even cycles. See channel number generator for details if required.

When an odd channel makes a CBS request, the CBS available latch is set off. The odd channel cannot ingate the LCSAR until the next even machine cycle (CICL only accesses CBS on even cycles). During that time an even channel will be in the process cycle, so it must not use the LCSAR. The even numbered channel is blocked by the CBS available latch being off. Hence, CBS available prevents even channels from ingating LCSAR while allowing odd channel ingating to LCSAR.

Address generation for an odd channel takes place during the P-cycle, is latched through the next cycle (odd cycle), and gated into the LCSAR on the following cycle (CBS1 cycle).

Even Number Channel Request - is made during odd cycles; is not allowed if an odd numbered channel made a request last cycle; will generate an LCSAR address during the P-cycle; ingates LCSAR with the generated address during the next cycle (CTS/DIS) if CBS is available.

Even numbered channels are in the P-cycle during odd machine cycles; generation of the LCSAR bits is done during this cycle. The generated address is gated into LCSAR on the next cycle.

Since CICL has access to LCS only on even cycles, only 1 channel can access LCS every 2 cycles. An even channel request will be blocked if an odd channel request is pending.

The even request is blocked through the CBS available latch. This path is used by all even numbered channels. As explained in Odd Channel Request, the CBS available latch will be turned off as a result of an odd channel request, and LCSAR will be ingated from the delay latches, which would contain the odd channels generated LCSAR address.

If no odd channel request is pending an even channel will ingate LCSAR one cycle after the P-cycle (CTS/DIS cycle).

While the invention has been particularly shown and described with reference to preferred embodiments thereof it will be understood by those skilled in the art that various changes in form and details may be made therein without departing from the spirit and the scope of the invention.

What is claimed is:

1. A data processing system including system storage and channel unit apparatus for transferring data between input/output devices and said system storage over a plurality of channels, each channel connected to one or more input/output devices, said channel unit apparatus comprising, channel store means for storing information including said data to be transferred over said channels, channel state memory means, storing information for all of said channels, having a plurality of groups of locations, one group for each of said channels where each group stores information for a different associated channel; said state memory means including, for each group, first locations for storing a count to designate a remaining transfer length where the remaining transfer length specifies a number of bytes of said data remaining to be transferred over the associated channel, second locations for storing a pointer for defining a location in said channel store means, and third locations for storing an availability number specifying the remaining locations in said channel store means, a first processor means operative for each of said channels to control the transfer of said data between said channel store means and said system storage in response to information in said state memory means for an associated channel, said first processor means including means connected to said state memory means for accessing said first, second and third locations for each channel, including means for transferring said data between said channel store means and said system storage by a first transfer amount for each channel, said first processor means including means for changing said availability number of a different associated group for each channel in one direction by the amount equal to said first transfer amount, second processor means operative for each of said channels to control the transfer of said data between said channel store means and said input/output devices in response to information in said state memory means for an associated channel, said second processor means including means connected to said state memory means for accessing said first, second and third locations for each channel, including means for transferring said data between said channel store means and said input/output devices by a second transfer amount for each channel, said second processor means including means for changing said availability number of a different associated group for each channel in a direction opposite said one direction by the amount equal to said second transfer amount.

2. The data processing of claim 1 wherein said channel store means includes said first, second and third locations associated with each of said channels and includes address means, responsive to said first and second processor means for accessing said locations.

3. The data processing system of claim 2 wherein said state memory means includes a shift register having a plurality of locations in each stage wherein each stage is operable to store control information for a different one of said channels and including means for stepping said shift register stages whereby the control information for each channel is available to different ones of said processors at different times.

4. The data processing system of claim 3 wherein said shift register stages includes a fourth location for storing a channel number for identifying the channel associated with that stage whereby said first and second processor means can identify a channel currently being processed.

5. The data processing system of claim 4 including means for transferring said channel number from said fourth location to said address means when said first processor means is active to form a high-order address in said address means, and means for transferring said channel number from said fourth location to said address means when said second processor means is active to form a high-order address in said address means.

6. The data processing system of claim 5 wherein said first processor means transfers said pointer from said second location to said address means to form a low-order field in said address means and wherein said second processor means transfers a combination of said pointer from said second location and said availability number from said third location to form a low-order field in said address means.

7. A data processing system as in claim 1 wherein for an output operation said first processor means includes means for controlling transfer of data from said system storage to said channel store means wherein said means for changing said availability number in said one direction includes means for decrementing said availability number, and wherein said second processor means includes means for transferring data from said channel store means to said input/output devices wherein said means for changing said availability number in a direction opposite said one direction includes means for incrementing said availability number.

8. A data processing system as in claim 1 wherein for an input operation said second processor means includes means for controlling transfer of data from said input/output devices to said channel store means wherein said means for changing said availability number in said direction opposite said one direction includes means for decrementing said availability number, and wherein said first processor means includes means for transferring data from said channel store means to said storage system wherein said means for changing said availability number in said one direction includes means for incrementing said availability number.

9. A data processing system as in claim 7 including means for decrementing said availability number by an amount equal to said first transfer amount.

10. A data processing system as in claim 8 including means for decrementing said availability number in said direction opposite said one direction by an amount equal to said second transfer amount.

11. A data processing system as in claim 1 wherein said first transfer amount is unequal to said second transfer amount.

12. A data processing system as in claim 1 including means for allocating access to said channel store means by said first or second processor means as a function of the magnitude of said availability number.

13. A data processing system including system storage and channel unit apparatus for transferring data between input/output devices and said system storage over a plurality of channels, each channel connected to one or more input/output devices, said channel unit apparatus comprising, channel store means for storing information including said data to be transferred over said channels, channel state memory means, storing information for all of said channels, having a plurality of groups of locations, one group for each of said channels where each group stores information for a different associated channel;

a first processor means operative for each of said channels to control the transfer of said data between said channel store means and said system storage in response to information in said state memory means for an associated channel, said first processor means including means connected to said state memory means for accessing first state information from a different one of said groups for each channel, including first means for transferring said data between said channel store means and said system storage in response to the accessed first state information for each channel, said first processor means including means for changing said first state information from a different one of said groups in response to transfers by said first means for transferring, second processor means operative for each of said channels to control the transfer of said data between said channel store means and said input/output devices in response to information in said state memory means for an associated channel, said second processor means including means connected to said state memory means for accessing second state information from a different one of said groups for each channel, including second means for transferring said data between said channel store means and said input/output devices in response to the accessed second state information for each channel, said second state information from a different one of said groups in response to transfers by said second means for transferring.

14. The data processing system of claim 13 wherein said channel state memory means includes a shift register having a plurality of stages and a plurality of locations in each stage wherein each stage is operable to store control information for a different one of said channels and including means for stepping said shift register stages whereby the control information for each channel is available to different ones of said processors at different times.

* * * * *